United States Patent
Shiratsuchi et al.

(10) Patent No.: US 12,384,400 B2
(45) Date of Patent: Aug. 12, 2025

(54) VEHICLE PRESENTATION CONTROL DEVICE, VEHICLE PRESENTATION CONTROL SYSTEM, AND VEHICLE PRESENTATION CONTROL METHOD

(71) Applicant: DENSO CORPORATION, Kariya (JP)

(72) Inventors: Toshiharu Shiratsuchi, Kariya (JP); Shiori Maneyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 18/453,054

(22) Filed: Aug. 21, 2023

(65) Prior Publication Data

US 2024/0010221 A1 Jan. 11, 2024

Related U.S. Application Data

(63) Continuation of application No. PCT/JP2022/002137, filed on Jan. 21, 2022.

(30) Foreign Application Priority Data

Feb. 22, 2021 (JP) .................................. 2021-026537

(51) Int. Cl.
*B60Q 1/00* (2006.01)
*B60W 40/04* (2006.01)
(Continued)

(52) U.S. Cl.
CPC ............ *B60W 50/14* (2013.01); *B60W 40/04* (2013.01); *B60W 50/0097* (2013.01);
(Continued)

(58) Field of Classification Search
CPC .. B60W 50/14; B60W 40/04; B60W 50/0097; B60W 60/0053;
(Continued)

(56) References Cited

U.S. PATENT DOCUMENTS 9,616,896 B1* 4/2017 Letwin .................. B60W 10/06
10,054,942 B2* 8/2018 Ichikawa .......... B60W 60/0059
(Continued)

FOREIGN PATENT DOCUMENTS

JP 2019064460 A 4/2019
JP 2019-070602 A 5/2019
(Continued)

*Primary Examiner* — Anh V La
(74) *Attorney, Agent, or Firm* — Harness, Dickey & Pierce, P.L.C.

(57) ABSTRACT

A vehicle presentation control device, which is usable in a vehicle capable of performing autonomous driving, includes a processor. The processor distinguishably specifies, as an autonomous driving start requirement to be satisfied for a start of autonomous driving without monitoring obligation, at least a driver requirement, which is a requirement highly likely to be solved by a driver, or an environmental requirement, which is a requirement less likely to be solved by the driver. The processor starts, as requirement presentation that presents information about requirement necessary for the start of autonomous driving, driver requirement presentation, which indicates that the driver requirement is necessary for the start of autonomous driving, before the start of autonomous driving, in response to the specified autonomous driving start requirement being the driver requirement.

25 Claims, 7 Drawing Sheets

(51) Int. Cl.
*B60W 50/00* (2006.01)
*B60W 50/14* (2020.01)
*B60W 60/00* (2020.01)

(52) U.S. Cl.
CPC ... *B60W 60/0053* (2020.02); *B60W 2050/143* (2013.01); *B60W 2050/146* (2013.01); *B60W 2540/215* (2020.02); *B60W 2554/406* (2020.02)

(58) Field of Classification Search
CPC ..... B60W 2050/143; B60W 2050/146; B60W 2540/215; B60W 2554/406; B60W 50/08; B60W 50/10; G08G 1/16
USPC ................ 340/425.5, 439, 988, 438, 441
See application file for complete search history.

(56) References Cited

U.S. PATENT DOCUMENTS

2017/0240183 A1* 8/2017 Suzuki .............. B60W 40/08
2019/0039618 A1  2/2019 Mori
2019/0202471 A1* 7/2019 Hashimoto ......... G05D 1/0088

FOREIGN PATENT DOCUMENTS

WO   WO-2017154396 A1   9/2017
WO   WO-2019/207621 A1   10/2019

* cited by examiner

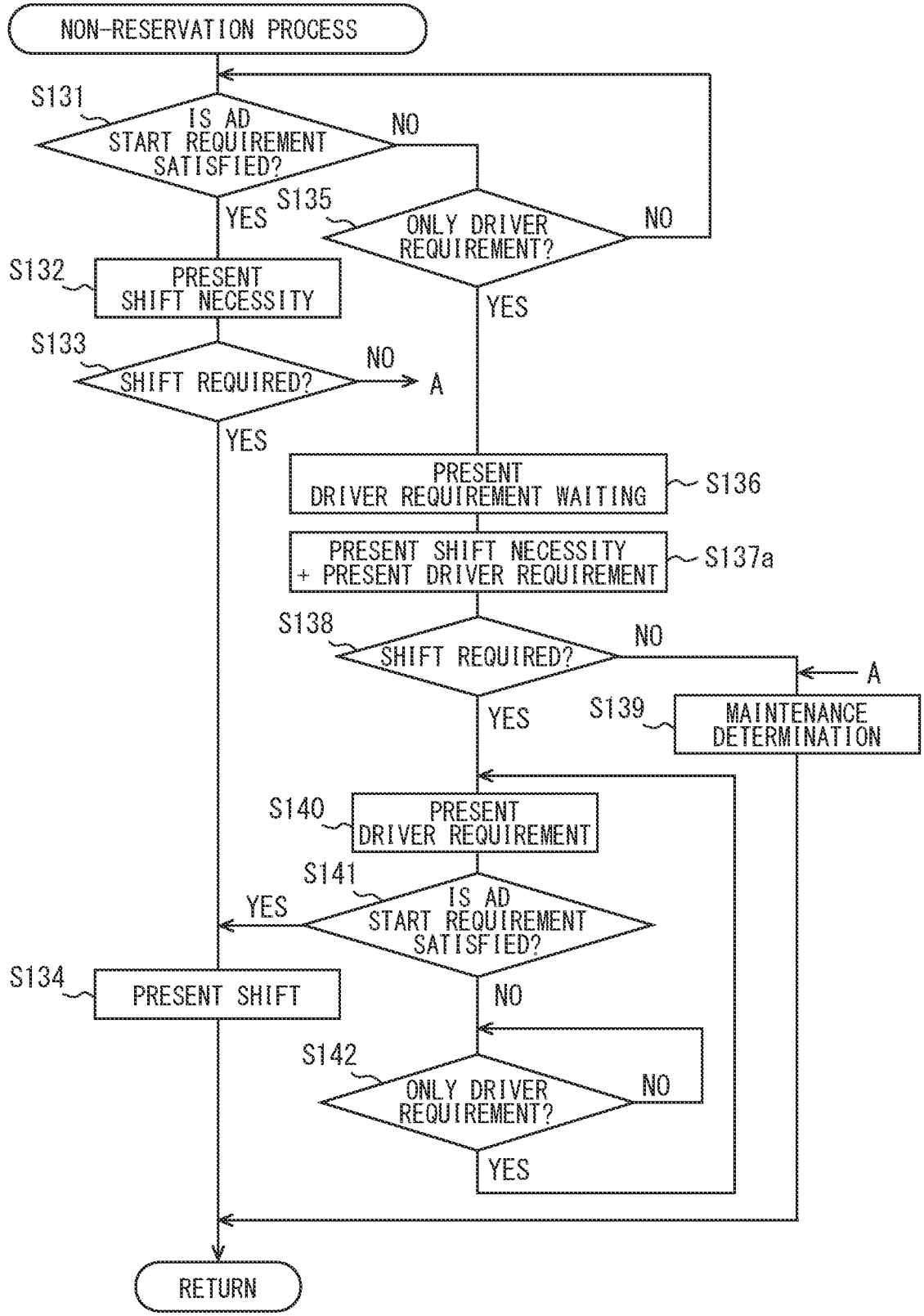

VEHICLE PRESENTATION CONTROL DEVICE, VEHICLE PRESENTATION CONTROL SYSTEM, AND VEHICLE PRESENTATION CONTROL METHOD

CROSS REFERENCE TO RELATED APPLICATIONS

The present application is a continuation application of International Patent Application No. PCT/JP2022/002137 filed on Jan. 21, 2022, which designated the U.S. and claims the benefit of priority from Japanese Patent Application No. 2021-026537 filed on Feb. 22, 2021. The entire disclosures of all of the above applications are incorporated herein by reference.

TECHNICAL FIELD

The present disclosure relates to a vehicle presentation control device, a vehicle presentation control system, and a vehicle presentation control method.

BACKGROUND

There has been known a technique of switching from manual driving to autonomous driving at a start point of an autonomous drivable area and switching from the autonomous driving to the manual driving at an end point of the autonomous drivable area.

SUMMARY

A vehicle presentation control device, which is usable in a vehicle capable of performing autonomous driving, includes a processor. The processor distinguishably specifies, as an autonomous driving start requirement to be satisfied for a start of autonomous driving without monitoring obligation, at least a driver requirement, which is a requirement highly likely to be solved by a driver, or an environmental requirement, which is a requirement less likely to be solved by the driver. The processor starts, as requirement presentation that presents information about requirement necessary for the start of autonomous driving, driver requirement presentation, which indicates that the driver requirement is necessary for the start of autonomous driving, before the start of autonomous driving, in response to the specified autonomous driving start requirement being the driver requirement.

BRIEF DESCRIPTION OF DRAWINGS

Objects, features and advantages of the present disclosure will become apparent from the following detailed description made with reference to the accompanying drawings.

FIG. 6 is a diagram showing an example of a schematic configuration of an HCU 10a, FIG. 7 is a flowchart showing an example of a flow of non-reservation process performed by the HCU 10a.

DETAILED DESCRIPTION

Figure 1:
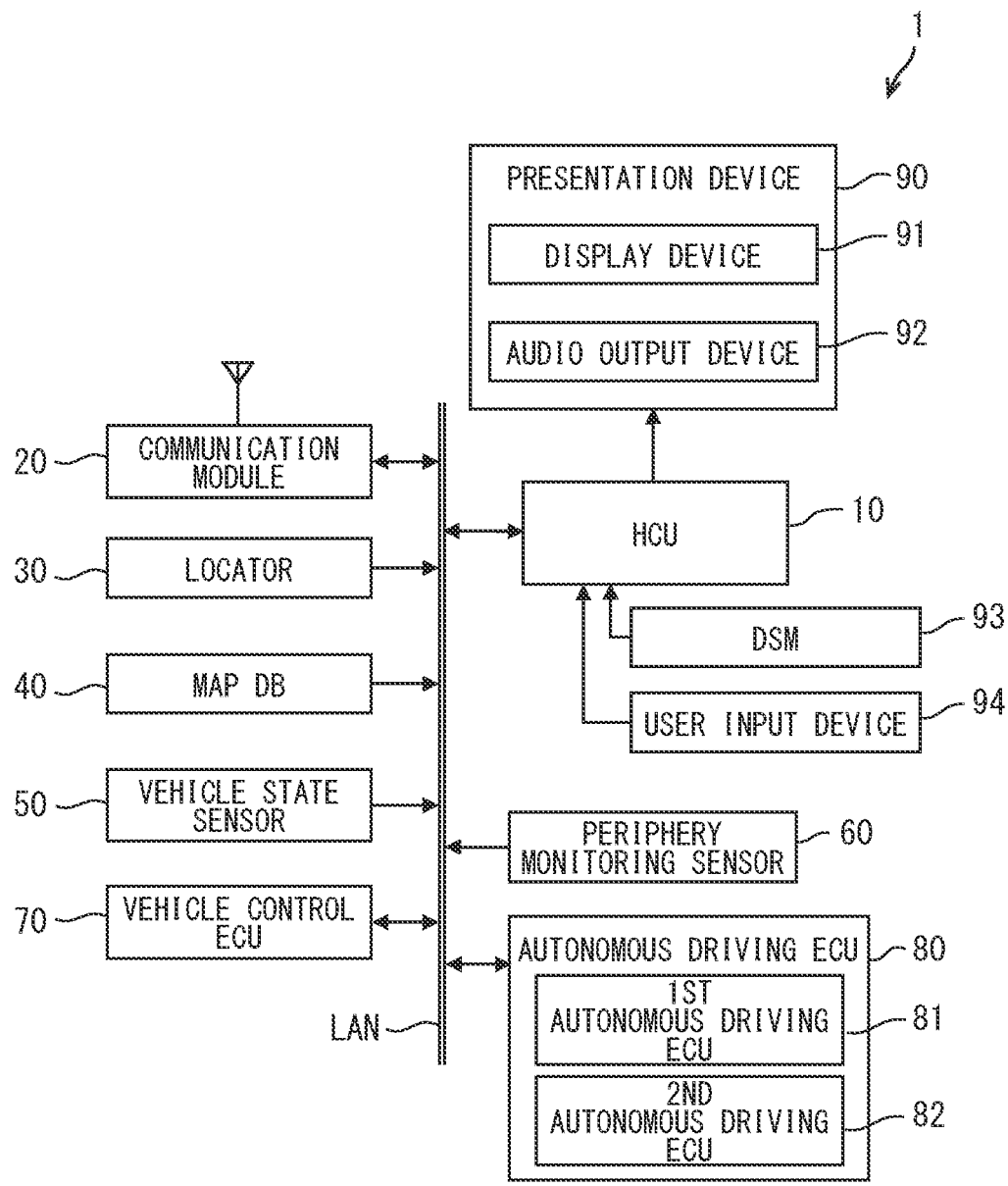
FIG. 1 is a diagram showing an example of a schematic configuration of a vehicle system 1.

Conventionally, a technique of switching from manual driving to autonomous driving at a start point of an autonomous drivable area and switching from the autonomous driving to the manual driving at an end point of the autonomous drivable area is known. In this configuration, takeover notification is performed as information presentation for notifying a start of transfer of a driving operation from an autonomous driving function to a driver, and takeover previous notice is performed as information presentation for notifying a driver of transfer of a driving operation from an autonomous driving function to the driver.

Above-described art discloses information presentation when switching from the autonomous driving to the manual driving, but does not disclose details of the information presentation when switching from the manual driving to the autonomous driving. There are multiple requirements to be satisfied to start the autonomous driving. The autonomous driving cannot be started unless these requirements are satisfied. It is considered that these requirements can be divided into requirements highly likely to be solved by the driver (hereinafter, referred to as driver requirements) and requirements less likely to be solved by the driver (hereinafter, referred to as environmental requirements). It is considered that a response to be taken by the driver is different depending on whether a requirement to be satisfied to start the autonomous driving is a driver requirement or not. Therefore, in order to smoothly switch from the manual driving to the autonomous driving, it is considered that it is necessary to perform information presentation in a mode corresponding to whether the requirement to be satisfied to start the autonomous driving is a driver requirement or not.

According to an aspect of the present disclosure, a vehicle presentation control device, which is usable in a vehicle capable of performing autonomous driving, includes a requirement specifying unit and a presentation control unit. The requirement specifying unit distinguishably specifies, as an autonomous driving start requirement to be satisfied for a start of autonomous driving, at least a driver requirement or an environmental requirement. The driver requirement is a requirement highly likely to be solved by the driver of the vehicle, and the environmental requirement is a requirement less likely to be solved by the driver of the vehicle. The presentation control unit starts, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified by the requirement specifying unit being the driver requirement.

According to another aspect of the present disclosure, a vehicle presentation control method, which is usable in a vehicle capable of performing autonomous driving, includes instructions to be executed by at least one processor. When being executed by the at least one processor, the instructions perform: a requirement specifying step distinguishably specifying, as an autonomous driving start requirement to be satisfied for a start of autonomous driving, at least a driver requirement or an environmental requirement, the driver requirement being a requirement highly likely to be solved by the driver of the vehicle and the environmental requirement being a requirement less likely to be solved by the driver of the vehicle; and a presentation control step starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified in the requirement specifying step being the driver requirement.

According to the above configuration, it is possible to distinguish between the driver requirement that is highly likely to be solved by the driver of the vehicle and the environmental requirement that is requirement less likely to be solved by the driver, and to perform driver requirement presentation indicating that the driver requirement is necessary for the start of the autonomous driving in response to that a requirement necessary for starting the autonomous driving is a driver requirement. Therefore, it is possible to perform information presentation in response to that the requirement necessary for starting the autonomous driving is the driver requirement. The driver requirement presentation is performed before the autonomous driving is started. Therefore, based on the driver requirement presentation, it is possible to prompt the driver to take a measure necessary for starting the autonomous driving before the start of the autonomous driving. As a result, it is possible to smoothly switch from the manual driving to the autonomous driving.

The vehicle presentation control system according to another aspect can be used in a vehicle capable of performing the autonomous driving. The vehicle presentation control system includes a presentation device presenting information to the driver of the vehicle and the above-described vehicle presentation control device.

Since the vehicle presentation control system includes the above-described vehicle presentation control device, it is possible to assist smooth switch from the manual driving to the autonomous driving.

Embodiments of the present disclosure will be described with reference to drawings. For convenience of description, parts having the same functions as those of the parts shown in the drawings used for the previous description in the plurality of embodiments may be denoted by the same reference symbols and the description thereof may be omitted. For the parts with the same reference symbols, the description in other embodiments can be referred to.

FIRST EMBODIMENT (Schematic Configuration of Vehicle System 1)

Hereinafter, the first embodiment according to the present disclosure will be described with reference to the drawings. The vehicle system 1 shown in FIG. 1 can be used in a vehicle capable of performing autonomous driving (hereinafter, referred to as an autonomous vehicle). As shown in FIG. 1, the vehicle system 1 includes a human machine interface control unit (HCU) 10, a communication module a locator 30, a map database (hereinafter, referred to as a map DB) 40, a vehicle state sensor 50, a periphery monitoring sensor 60, a vehicle control ECU 70, an autonomous driving ECU 80, a presentation device 90, a driver status monitor (DSM) 93, and a user input device 94. The vehicle system 1 corresponds to a vehicle presentation control system. For example, the HCU 10, the communication module the locator 30, the map DB 40, the vehicle state sensor 50, the periphery monitoring sensor 60, the vehicle control ECU 70, and the autonomous driving ECU may be configured to be connected to an in-vehicle LAN (see a LAN in FIG. 1). The vehicle using the vehicle system 1 is not necessarily limited to an automobile, and a case where the vehicle system 1 is used in an automobile will be described below as an example.

An autonomous driving degree (hereinafter, referred to as an automation level) of the autonomous vehicle may include a plurality of levels as defined by SAE, for example. The automation level is divided into, for example, LV0 to 5 as follows.

LV0 is a level at which a driver performs all driving tasks without intervention of the system. The driving tasks may be reworded as dynamic driving tasks. The driving tasks are, for example, steering, acceleration and deceleration, and periphery monitoring. LV0 corresponds to so-called manual driving. LV1 is a level at which the system supports either the steering or the acceleration and deceleration. LV1 corresponds to so-called driving-assistance. LV2 is a level at which the system supports both the steering and the acceleration and deceleration. LV2 corresponds to so-called partial driving automation. LV1 and 2 are also assumed to be a part of the autonomous driving.

For example, the autonomous driving at LV1 and 2 is assumed to be autonomous driving in which the driver has a monitoring obligation related to safe driving (hereinafter, simply referred to as a monitoring obligation). Examples of the monitoring obligation include periphery monitoring by visual observation. The autonomous driving at LV1 and 2 can be reworded as autonomous driving in which a second task is not permitted. The second task is an action other than driving permitted for the driver, and is a specific action defined in advance. The second task can also be reworded as a secondary activity, other activities, or the like. The second task must not prevent the driver from responding to a request to take over a driving operation from an autonomous driving system. As an example, actions, for example, watching content such as moving images, operating smartphones or the like, reading books, and eating are assumed as the second task.

The autonomous driving at LV3 is at a level at which the system can perform all the driving tasks under a specific condition and the driver performs the driving operation in an emergency. In the autonomous driving at LV3, it is required that the driver can quickly respond to a request of driving takeover from the system. The driving takeover can also be reworded as transfer of the periphery monitoring obligation from the vehicle system to the driver. LV3 corresponds to so-called conditional driving automation. LV3 includes an area-limited LV3 limited to a specific area. The specific area described here may be a motorway or an expressway. The specific area may be, for example, a specific lane. LV3 also includes a traffic congestion-limited LV3 that is limited to a traffic congested time. The traffic congestion-limited LV3 may be limited to, for example, a traffic congested time on a motorway or an expressway.

The autonomous driving at LV4 is at a level at which the system can perform all the driving tasks except for a specific situation such as a road or a limit environment which cannot be handled. LV4 corresponds to so-called advanced driving automation. The autonomous driving at LV5 is at a level at which the system can perform all the driving tasks under all environments. The LV5 corresponds to so-called complete driving automation.

For example, the autonomous driving at LV3 to 5 is autonomous driving in which the driver does not have the monitoring obligation. That is, the autonomous driving at LV3 to 5 corresponds to autonomous driving without monitoring obligation. The autonomous driving at LV3 to 5 can be reworded as autonomous driving in which the second task is permitted. Among the autonomous driving at Levels 3 to 5, the autonomous driving at Level 4 or higher is assumed to be autonomous driving in which the driver is permitted to sleep (hereinafter, referred to as sleep-permitted autonomous driving). Among the autonomous driving at Levels 3 to 5, the autonomous driving at Level 3 is assumed to be autonomous driving in which the driver is not permitted to sleep (hereinafter, referred to as sleep-unpermitted autonomous driving).

In the autonomous vehicle according to the present embodiment, the automation levels can be switched. The automation levels may be configured to be switchable only between a part of the levels among LV0 to 5. In the present embodiment, a case where the autonomous vehicle can be switched among the autonomous driving at LV3, the autonomous driving at LV2 or lower, and the manual driving at LV0 will be described as an example.

The communication module 20 transmits and receives information to and from a center outside a subject vehicle via wireless communication. That is, wide area communication is performed. The communication module 20 receives traffic congestion information and the like on periphery monitoring of the subject vehicle from the center through the wide area communication. The communication module may transmit and receive information to and from another vehicle via the wireless communication. That is, vehicle-to-vehicle communication may be performed. The communication module 20 may transmit and receive information to and from a roadside device provided at a side of a road through the wireless communication. That is, road-to-vehicle communication may be performed. When the road-to-vehicle communication is performed, the communication module 20 may receive, via the roadside device, information on a periphery vehicle of the subject vehicle transmitted from the periphery vehicle. The communication module 20 may receive, via the center through the wide area communication, the information on the periphery vehicle of the subject vehicle transmitted from the periphery vehicle.

The locator 30 includes a global navigation satellite system (GNSS) receiver and an inertial sensor. The GNSS receiver receives positioning signals from a plurality of positioning satellites. The inertial sensor includes, for example, a gyro sensor and an acceleration sensor. The locator 30 combines the positioning signals received by the GNSS receiver with a measurement result of the inertial sensor to sequentially measure a vehicle position of the subject vehicle (hereinafter, referred to as a subject vehicle position) in which the locator 30 is mounted. The subject vehicle position is represented by coordinates of a latitude and a longitude. Positioning the subject vehicle position may be performed by using a travel distance obtained based on signals sequentially output from a vehicle speed sensor mounted in the vehicle.

The map DB 40 is a non-volatile memory and stores high accuracy map data. The high accuracy map data is map data with higher accuracy than map data used for route guidance by a navigation function. The map DB 40 may also store the map data used for route guidance. The high accuracy map data includes, for example, information usable for autonomous driving, such as three-dimensional shape information on a road, information on the number of lanes, and information indicating a traveling direction allowed by each lane. The high accuracy map data may include information on node points indicating positions of both ends of a road marking such as a lane marking. The locator 30 may be configured not to use the GNSS receiver by using the three-dimensional shape information on a road. For example, the locator 30 may be configured to specify the subject vehicle position by using the three-dimensional shape information on a road and a detection result obtained by a light detection and ranging/laser imaging detection and ranging (LIDAR) that detects a group of feature points of a road shape and a structure or the periphery monitoring sensor 60 such as a periphery monitoring camera. The three-dimensional shape information on a road may be generated based on a captured image by a road experience management (REM).

The communication module 20 may receive, through, for example, the wide area communication, map data distributed from an external server and store the map data in the map DB 40. In this case, the communication module 20 may sequentially acquire the map data of a region corresponding to the subject vehicle position using the map DB 40 as a volatile memory.

The vehicle state sensor 50 is a sensor group for detecting various states of the subject vehicle. Examples of the vehicle state sensor 50 include a vehicle speed sensor that detects a vehicle speed and a steering sensor that detects a steering angle. Examples of the vehicle state sensor 50 include a remaining amount sensor that detects a remaining amount of a traveling energy source. Examples of the vehicle state sensor 50 include an automatic mode switch that detects whether an automatic mode of a windshield wiper is on or off. Examples of the vehicle state sensor 50 include a light switch that detects whether an automatic light function of a headlight is on or off. The vehicle state sensor 50 outputs detected sensing information to the in-vehicle LAN. The sensing information detected by the vehicle state sensor 50 may be output to the in-vehicle LAN via an ECU mounted in the subject vehicle.

The periphery monitoring sensor 60 monitors a periphery environment of the subject vehicle. As an example, the periphery monitoring sensor 60 detects a moving object such as a pedestrian or the other vehicle, and an obstacle around the subject vehicle called a stationary object such as a fallen object on a road. The road marking such as a traveling lane marking around the subject vehicle is detected. The periphery monitoring sensor 60 is a sensor, for example, a periphery monitoring camera that captures an image of a predetermined range around the subject vehicle, a millimeter wave radar, a sonar, or a LIDAR that transmits probe waves to the predetermined range around the subject vehicle. The periphery monitoring camera sequentially outputs, to the autonomous driving ECU 80, captured images that are sequentially captured as the sensing information. The sensor such as a sonar, a millimeter wave radar, or a LIDAR that transmits the probe waves sequentially outputs a scanning result, which is obtained based on received signals obtained when reflected waves reflected by the obstacle are received, to the autonomous driving ECU 80 as sensing information. The sensing information detected by the periphery monitoring sensor 60 may be output to the in-vehicle LAN via the autonomous driving ECU 80.

The vehicle control ECU 70 is an electronic control device that performs travel control of the subject vehicle. Examples of the travel control include acceleration and deceleration control and/or steering control. Examples of the vehicle control ECU 70 include a steering ECU that performs steering control, a power unit control ECU that performs the acceleration and deceleration control, and a brake ECU. The vehicle control ECU 70 performs travel control by outputting a control signal to travel control devices such as an electronic control throttle, a brake actuator, and an electric power steering (EPS) motor mounted on the subject vehicle.

The autonomous driving ECU 80 includes, for example, a processor, a memory, an I/O, and a bus that connects the processor, the memory, and the I/O, and executes processing related to the autonomous driving by executing a control program stored in the memory. The memory described here is a non-transitory tangible storage medium that non-temporarily stores a program and data that are readable by a computer. The non-transitory tangible storage medium is implemented by a semiconductor memory, a magnetic disk, or the like.

The autonomous driving ECU 80 includes a first autonomous driving ECU 81 and a second autonomous driving ECU 82. In the following description, the first autonomous driving ECU 81 and the second autonomous driving ECU 82 each include a processor, a memory, an I/O and a bus that connects the processor, the memory, and the I/O. A common processor may have functions of the first autonomous driving ECU 81 and the second autonomous driving ECU 82 by a virtual technique.

The first autonomous driving ECU 81 has a function of performing the autonomous driving at LV2 or lower described above. In other words, the first autonomous driving ECU 81 can perform autonomous driving having monitoring obligation. For example, the first autonomous driving ECU 81 can execute at least one of longitudinal direction control and lateral direction control of the subject vehicle. The longitudinal direction is a direction that coincides with a front-rear direction of the subject vehicle. The lateral direction is a direction that coincides with a width direction of the subject vehicle. The first autonomous driving ECU 81 executes the acceleration and deceleration control of the subject vehicle as the longitudinal direction control. The first autonomous driving ECU 81 executes the steering control of the subject vehicle as the lateral direction control. The first autonomous driving ECU 81 includes a first environment recognition unit, an ACC control unit, an LTA control unit, an LCA control unit, and the like as functional blocks.

The first environment recognition unit recognizes a traveling environment around the subject vehicle based on the sensing information acquired from the periphery monitoring sensor 60. As an example, the first environment recognition unit recognizes a detailed position of the subject vehicle in the traveling lane based on information such as left and right lane markings of the traveling lane of the subject vehicle (hereinafter, referred to as an own lane). The first environment recognition unit recognizes a position and a speed of an obstacle such as a vehicle around the subject vehicle. The first environment recognition unit recognizes a position and a speed of an obstacle such as a vehicle in the own lane. Further, the first environment recognition unit recognizes a position and a speed of an obstacle such as a vehicle in a periphery lane of the own lane. The periphery lane may be set as, for example, an adjacent lane of the own lane. The periphery lane may be set as a lane other than the own lane in a road section where the subject vehicle is located. The first environment recognition unit may have the same configuration as a second environment recognition unit to be described later.

The ACC control unit executes adaptive cruise control (ACC) control for realizing constant speed travel of the subject vehicle at a target speed or travel of the subject vehicle following a preceding vehicle. The ACC control unit may execute the ACC control using the position and the speed of the vehicle around the subject vehicle recognized by the first environment recognition unit. The ACC control unit may execute the ACC control by causing the vehicle control ECU 70 to perform the acceleration and deceleration control.

The LTA control unit executes lane tracing assist (LTA) control for maintaining traveling of the subject vehicle on a lane. The LTA control unit may execute the LTA control using the detailed position of the subject vehicle in the own lane recognized by the first environment recognition unit. The LTA control unit may execute the LTA control by causing the vehicle control ECU 70 to perform the steering control. The ACC control is an example of the longitudinal direction control. The LTA control is an example of the lateral direction control.

The LCA control unit executes a lane change assist (LCA) control for automatically changing the subject vehicle from the own lane to an adjacent lane. The LCA control unit may execute the LCA control using the position and the speed of the vehicle around the subject vehicle recognized by the first environment recognition unit. For example, the LCA control may be executed when the speed of the preceding vehicle of the subject vehicle is a low speed equal to or lower than a predetermined value and no periphery vehicle approaching from a side to a rear side of the subject vehicle exists. For example, the LCA control unit may execute the LCA control by causing the vehicle control ECU 70 to perform the acceleration and deceleration control and the steering control.

The first autonomous driving ECU 81 realizes the autonomous driving at LV2 by executing both the ACC control and the LTA control. The LCA control may be executable, for example, when the ACC control and the LTA control are executed. The first autonomous driving ECU 81 may realize the autonomous driving at LV1 by executing either the ACC control or the LTA control.

On the other hand, the second autonomous driving ECU 82 has a function of performing the autonomous driving at LV3 or higher described above. In other words, the second autonomous driving ECU 82 enables the realization of the autonomous driving without monitoring obligation. The second autonomous driving ECU 82 includes a second environment recognition unit, an action determination unit, a trajectory generation unit, and the like as functional blocks.

The second environment recognition unit recognizes the traveling environment around the subject vehicle based on the sensing information acquired from the periphery monitoring sensor 60, the subject vehicle position acquired from the locator 30, the map data acquired from the map DB 40, information on the other vehicle acquired by the communication module 20, and the like. As an example, the second environment recognition unit generates, by using the information, a virtual space in which an actual traveling environment is reproduced.

The second environment recognition unit recognizes a manual driving area (hereinafter, referred to as an MD area) in a traveling region of the subject vehicle. The second environment recognition unit recognizes an autonomous driving area (hereinafter, referred to as an AD area) in the traveling region of the subject vehicle. The second environment recognition unit recognizes an ST section and a non-ST section to be described later in the AD area.

The MD area is an area in which the autonomous driving is prohibited. In other words, the MD area is defined as an area in which the driver executes all of the longitudinal direction control, the lateral direction control, and the periphery monitoring of the subject vehicle. For example, the MD area may be a general road.

The AD area is an area in which the autonomous driving is permitted. In other words, the AD area is defined as an area in which the subject vehicle can replace the driver to execute one or more of the longitudinal direction control, the lateral direction control, and the periphery monitoring. For example, the AD area may be an expressway or a motorway. The autonomous driving at the traffic congestion-limited LV3 may be permitted only at a traffic congested time in the AD area, for example.

The AD area is divided into the ST section and the non-ST section. The ST section is a section in which the autonomous driving at the area-limited LV3 is permitted. The autonomous driving at the area-limited LV3 may be permitted only in a specific lane (hereinafter, referred to as an ST lane) in the ST section. The non-ST section is a section in which the autonomous driving at LV2 or lower is possible. In the present embodiment, the non-ST section in which the autonomous driving at LV1 is permitted and the non-ST section in which the autonomous driving at LV2 is permitted are not divided. The ST section may be, for example, a traveling section in which the high accuracy map data is prepared. The non-ST section may be a section not corresponding to the ST section in the AD area.

The action determination unit determines, based on a recognition result of the traveling environment obtained by the second environment recognition unit and the like, an action (hereinafter, referred to as a future action) scheduled for the subject vehicle. The action determination unit determines the future action for causing the subject vehicle to travel by the autonomous driving. The action determination unit may determine a type of action to be taken by the subject vehicle in order to arrive at a destination as the future action. Examples of this type include straight ahead, right turn, left turn, and lane change.

The trajectory generation unit generates, based on the recognition result of the traveling environment obtained by the second environment recognition unit and the future action determined by the action determination unit, a traveling trajectory of the subject vehicle in a section in which the autonomous driving is executable. The traveling trajectory includes, for example, target positions of the subject vehicle according to traveling and a target speed at each target position. The trajectory generation unit sequentially provides the generated traveling trajectory as a control command to be executed by the subject vehicle in the autonomous driving to the vehicle control ECU 70.

The autonomous driving ECU 80 includes a requirement determination unit that determines whether the subject vehicle is in a state in which the autonomous driving can be executed. The requirement determination unit may be provided in each of the first autonomous driving ECU 81 and the second autonomous driving ECU 82, or may have a common configuration.

The requirement determination unit determines whether the subject vehicle is in a state in which the autonomous driving can be executed. The requirement determination unit may determine, for each automation level, whether the subject vehicle is in a state in which the autonomous driving can be executed. The requirement determination unit may determine whether the subject vehicle is in a state in which the autonomous driving can be executed based on whether a requirement to be satisfied to start the autonomous driving (hereinafter, referred to as an autonomous driving start requirement) is satisfied. Hereinafter, the autonomous driving start requirement is referred to as an AD start requirement. In the present embodiment, examples of the AD start requirement include the following requirements.

Examples of a first requirement include that the traveling section is a section in which the autonomous driving is permitted. The first requirement is called a section requirement. As an example, the traveling section of the subject vehicle being the AD area may be a section requirement for executing the autonomous driving at or below the traffic congestion-limited LV3. The traveling section of the subject vehicle being the ST section in the AD area may be set as a section requirement for executing the autonomous driving at the area-limited LV3. The requirement determination unit may determine whether the section requirement is satisfied, for example, based on the subject vehicle position measured by the locator and the map data of the map DB 40.

Examples of a second requirement include that a structure separating lanes in back and forth directions (hereafter, referred to as a separation structure) is present. Examples of the separation structure include a median strip and a pole. The second requirement is called a separation structure requirement. The separation structure requirement may be an autonomous driving requirement of LV3. The separation structure requirement may be set as a requirement for executing the autonomous driving at Level 4 or higher can be executed, or may be set as a requirement for executing the autonomous driving at Level 2 can be executed. The reason why the separation structure requirement is set as the autonomous driving requirement is that a recognition accuracy of the traveling environment may decrease when the separation structure is not present. The requirement determination unit may determine whether the separation structure requirement is satisfied, for example, by image recognition of the captured image of the periphery monitoring camera.

Examples of a third requirement include that the vehicle speed of the subject vehicle is equal to or lower than a vehicle speed threshold. The third requirement is referred to as a vehicle speed requirement. The vehicle speed requirement may be the autonomous driving requirement of LV3. The vehicle speed requirement may be set as a requirement for executing the autonomous driving at Level 4 or higher, or may be set as a requirement for executing the autonomous driving at Level 2 or lower. The reason why the vehicle speed requirement is set as the autonomous driving requirement is that periphery monitoring may not be sufficiently monitored only by the vehicle system when the vehicle speed becomes too high. The vehicle speed requirement may be provided for each automation level. The vehicle speed requirement may be the same for a plurality of automation levels. For example, a vehicle speed threshold value at which the autonomous driving at LV3 can be executed may be smaller than a vehicle speed threshold value at which the autonomous driving at LV2 or lower can be executed. The requirement determination unit may determine whether the vehicle speed requirement is satisfied, for example, based on a sensing result of the vehicle speed sensor of the vehicle state sensor 50.

A fourth requirement may be that a traveling road of the subject vehicle has the number of lanes equal to or greater than a predetermined number. As an example, examples of a fourth requirement may include that the traveling road of the subject vehicle is a plurality of lanes in each direction. The fourth requirement is referred to as a requirement of the number of lanes. The requirement of the number of lanes may be the autonomous driving requirement of LV3. The requirement of the number of lanes may be set as a requirement for executing autonomous driving at level 2 or lower.

For example, the requirement of the number of lanes at Level 2 or lower may be one lane or more in each direction. The reason why the requirement of the number of lanes is set as the autonomous driving requirement is that the recognition accuracy of the traveling environment may decrease when a plurality of lanes are present in each direction. The requirement determination unit may determine whether the requirement of the number of lanes is satisfied, for example, by the image recognition with respect to the captured image of the periphery monitoring camera described above.

A fifth requirement may be that a vehicle-to-vehicle distance between the subject vehicle and the preceding vehicle is appropriate. The fifth requirement is referred to as a vehicle-to-vehicle distance requirement. The vehicle-to-vehicle distance requirement may be the autonomous driving requirement of LV3. The vehicle-to-vehicle distance requirement may be set as a requirement for executing the autonomous driving at Level 2 or lower. The reason why the vehicle-to-vehicle distance requirement is set as the autonomous driving requirement is that it may be difficult to respond to proximity avoidance to the periphery vehicle by the vehicle system alone when the vehicle-to-vehicle distance to the periphery vehicle is too short. The requirement determination unit may determine whether the vehicle-to-vehicle distance requirement is satisfied, for example, based on the sensing information of the periphery monitoring sensor 60.

A sixth requirement may be that the traffic congestion occurs around the subject vehicle. The sixth requirement is referred to as a traffic congestion requirement. The traffic congestion requirement may be an autonomous driving requirement of the traffic congestion-limited LV3. The traffic congestion requirement may be set as a requirement for executing the autonomous driving at Level 2. The reason why the traffic congestion requirement is set as the autonomous driving requirement is that since the speed of the subject vehicle and the speed of the periphery vehicle are low at a traffic congested time, it is easy to respond to proximity avoidance to the periphery vehicle by the vehicle system alone. The requirement determination unit may determine whether the traffic congestion requirement is satisfied, for example, based on the low speed and the number of periphery vehicles detected by the periphery monitoring sensor 60.

A seventh requirement may be a section of which a high accuracy map is being prepared. The seventh requirement is referred to as a high accuracy map requirement. The high accuracy map requirement may be the autonomous driving requirement of LV3. The requirement determination unit may determine whether the high accuracy map requirement is satisfied, for example, based on the subject vehicle position measured by the locator 30 and the high accuracy map data of the map DB 40.

An eighth requirement may be that a state of the driver is appropriate. The eighth requirement is referred to as a driver state requirement. As an example, a state in which the driver satisfies the monitoring obligation may be a requirement for executing the autonomous driving at LV 3. The state in which the driver satisfies the monitoring obligation includes an arousal state, a state in which the face faces forward, a state in which a posture is not collapsed, and the like. The requirement determination unit may determine whether the driver state requirement is satisfied based on a detection result obtained by a DSM 93 to be described later.

A ninth requirement may be that the steering wheel is being grasped. The ninth requirement is referred to as a grasp requirement. The grasp requirement may be an autonomous driving requirement of LV2 or lower. The requirement determination unit may determine whether the grasp requirement is satisfied based on a detection result obtained by a sensor that detects grasping of the steering wheel.

A tenth requirement may be that the traveling lane of the subject vehicle is appropriate for the autonomous driving. The tenth requirement is referred to as a traveling lane requirement. As an example, the own lane being in the traffic congestion may be set as the traveling lane requirement of the traffic congestion-limited LV3. The traveling lane of the subject vehicle being the ST lane described above may be set as the traveling lane requirement of the area-limited LV3. The requirement determination unit may determine whether the traveling lane requirement is satisfied, for example, based on the subject vehicle position measured by the locator 30 and the high accuracy map data of the map DB 40.

An eleventh requirement may be that the windshield wiper and the headlight of the subject vehicle are set to an automatic mode. The eleventh requirement is referred to as an autonomous mode requirement. The autonomous mode requirement may be a requirement for executing the autonomous driving at LV3. The requirement determination unit may determine whether the autonomous mode requirement is satisfied based on signals of the automatic mode switch of the windshield wiper and the light switch of the headlight described above.

A twelfth requirement may be that a remaining amount of the traveling energy source of the subject vehicle is a predetermined value or more. The predetermined value can be set to any value. The twelfth requirement is referred to as an energy requirement. Examples of the remaining amount of the traveling energy source include a remaining fuel level and a remaining charging amount. The energy requirement may be a requirement for executing the autonomous driving at LV3. The requirement determination unit may determine whether the energy requirement is satisfied based on a detection result of the remaining amount sensor described above.

A thirteenth requirement may be that the weather may not be bad weather. The thirteenth requirement is referred to as a weather requirement. Examples of the bad weather include heavy rain, dense fog, and heavy snow. The weather requirement may be a requirement for executing the autonomous driving at LV3 or lower. The weather requirement may be a requirement for executing the autonomous driving at LV4 or lower. The requirement determination unit may determine whether the weather requirement is satisfied by the image recognition with respect to the captured image of the periphery monitoring camera described above.

A fourteenth requirement may be that the periphery monitoring sensor 60 is not undetectable (that is, sensor lost). The fourteenth requirement is referred to as a recognition requirement. The recognition requirement may be a requirement for executing the autonomous driving at LV1 or higher. The requirement determination unit may determine whether the recognition requirement is satisfied based on the sensing information of the periphery monitoring sensor 60.

A fifteenth requirement may be that the automation level is appropriate. The fifteenth requirement is referred to as a level requirement. As an example, in a case of a specification in which it is not possible to switch to the autonomous driving at LV3 when the autonomous driving is not switched to LV2, the level requirement of the autonomous driving at LV3 is that the current automation level is LV2. The requirement determination unit may determine whether the level requirement is satisfied based on the automation level of the autonomous driving being performed by the autonomous driving ECU 80.

In the present embodiment, the above requirements are described as an example, and the present disclosure is not limited thereto. The autonomous driving requirement may be a part of the above requirements. Requirements other than the above requirements may also be included.

The autonomous driving requirement can be classified into a driver requirement and an environmental requirement. The autonomous driving requirement can be reworded as an AD start requirement to be satisfied to start the autonomous driving. The driver requirement is a requirement highly likely to be solved by the driver of the vehicle. The environmental requirement is a requirement unlikely to be solved by the driver of the vehicle. Whether a requirement is highly likely or unlikely to be solved by the driver of the vehicle may be distinguished by, for example, a ratio of an element that can be solved by the driver to an element that cannot be solved by the driver. As an example, the vehicle speed requirement, the vehicle-to-vehicle distance requirement, the driver state requirement, the grasp requirement, the traveling lane requirement, the autonomous mode requirement, the energy requirement, and the level requirement may be classified as the driver requirement. On the other hand, the section requirement, the separation structure requirement, the requirement of the number of lanes, the traffic congestion requirement, the high accuracy map requirement, the weather requirement, and the recognition requirement may be classified as the environmental requirement. This classification may be appropriately changed.

The autonomous driving system including the autonomous driving ECU 80 described above enables the subject vehicle to execute the autonomous driving at LV2 or lower and LV3 or higher. The autonomous driving ECU 80 switches the automation level of the autonomous driving of the subject vehicle as necessary. As an example, when the subject vehicle moves from the MD area to the non-ST section in the AD area, the autonomous driving ECU 80 may switch from the manual driving to the autonomous driving at Level 2 or lower. When the subject vehicle moves from the MD area to the ST section in the AD area, the autonomous driving ECU 80 may switch from the manual driving to the autonomous driving at Level 3. When the subject vehicle moves from the non-ST section to the ST section in the AD area, the autonomous driving ECU 80 may switch from the autonomous driving at Level 2 or lower to the autonomous driving at Level 3. When the subject vehicle moves from the ST section to the non-ST section in the AD area, the autonomous driving ECU 80 may switch from the autonomous driving at Level 3 to the autonomous driving at Level 2 or lower. When the subject vehicle moves from the ST section in the AD area to the MD area, the autonomous driving ECU 80 may switch from the autonomous driving at Level 3 to the manual driving. When the subject vehicle moves from the non-ST section in the AD area to the MD area, the autonomous driving ECU 80 may switch from the autonomous driving at Level 2 or lower to the manual driving.

The autonomous driving ECU 80 may be configured to perform switching to increase the automation level when a request or agreement of the driver is given. On the other hand, the autonomous driving ECU 80 may be configured to perform switching to reduce the automation level, for example, when the driver responds to a request from the vehicle system. Hereinafter, the description of processing related to switching of reducing the automation level will be omitted. When the user input device 94 described later includes a switch for switching the automation level, an operation of the switch corresponds to the driver's request. The agreement of the driver will be described later.

The presentation device 90 is provided in the subject vehicle and presents information to the driver of the subject vehicle. The presentation device 90 performs the information presentation according to an instruction from the HCU 10. The presentation device 90 may at least present the information to the driver. The presentation device 90 may further present the information to a passenger other than the driver. The presentation device 90 includes a display device 91 and an audio output device 92.

The display device 91 performs the information presentation by displaying the information. As the display device 91, for example, a meter multi-information display (MID), a center information display (CID), or a head-up display (HUD) can be used. The meter MID is a display device provided in front of a driver's seat in a vehicle cabin. As an example, the meter MID may be provided in a meter panel. The CID is a display device disposed at a center of an instrument panel of the subject vehicle. The HUD is provided in, for example, the instrument panel in the vehicle cabin. The HUD projects a display image formed by a projector onto a projection region defined in a front windshield serving as a projection member. Light reflected from an image to a vehicle interior side by the front windshield is perceived by a driver seated in the driver's seat. Accordingly, the driver can visually recognize a virtual image of the display image formed in front of the front windshield in an overlapping manner with a part of the foreground. The HUD may be configured to project the display image onto a combiner provided in front of the driver's seat instead of the front windshield. The audio output device 92 performs the information presentation by outputting a sound. Examples of the audio output device 92 include a speaker.

The DSM 93 includes a near-infrared light source, a near-infrared camera, a control unit that controls the near-infrared light source and the near-infrared camera, and the like. The DSM 934 is disposed on, for example, an upper surface of the instrument panel in a posture in which the near-infrared camera faces the driver's seat side of the subject vehicle. The DSM 93 captures, by the near-infrared camera, the driver irradiated with near-infrared light by the near-infrared light source. A capture range may be set to include at least a head of the driver. The captured image obtained by the near-infrared camera is subjected to image analysis by the control unit. The control unit detects an arousal level, a face orientation, a collapse of the posture, and the like of the driver based on the feature of the driver extracted by performing the image analysis on the captured image. As the detection of the arousal level, at least an arousal state and a sleep state may be distinguished and detected.

The user input device 94 receives an input from a user. The user input device 94 may be an operation device that receives an operation input from the user. The operation device may be a mechanical switch, or may be a touch switch integrated with the display device 91. The user input device 94 is not limited to the operation device that receives the operation input as long as the user input device 94 is a device that receives the input from the user. For example, the user input device 94 may be an audio input device that receives an input of a command obtained by a sound from the user.

The HCU 10 mainly implemented by a computer including a processor, a volatile memory, a non-volatile memory, an I/O, and a bus that connects the processor, the volatile memory, the non-volatile memory, and the I/O. The HCU 10 is connected to the presentation device 90, the DSM 93, the user input device 94, and the in-vehicle LAN. The HCU 10 controls the information presentation performed by the presentation device 90 by executing a control program stored in the non-volatile memory. The HCU 10 corresponds to a vehicle presentation control device. In the present embodiment, a case where the HCU 10 is used in a vehicle capable of performing at least the autonomous driving without monitoring obligation as the autonomous driving will be described as an example. The configuration of the HCU relating to control of the information presentation performed by the presentation device 90 will be described in detail below.

(Schematic Configuration of HCU 10)

Figure 2:
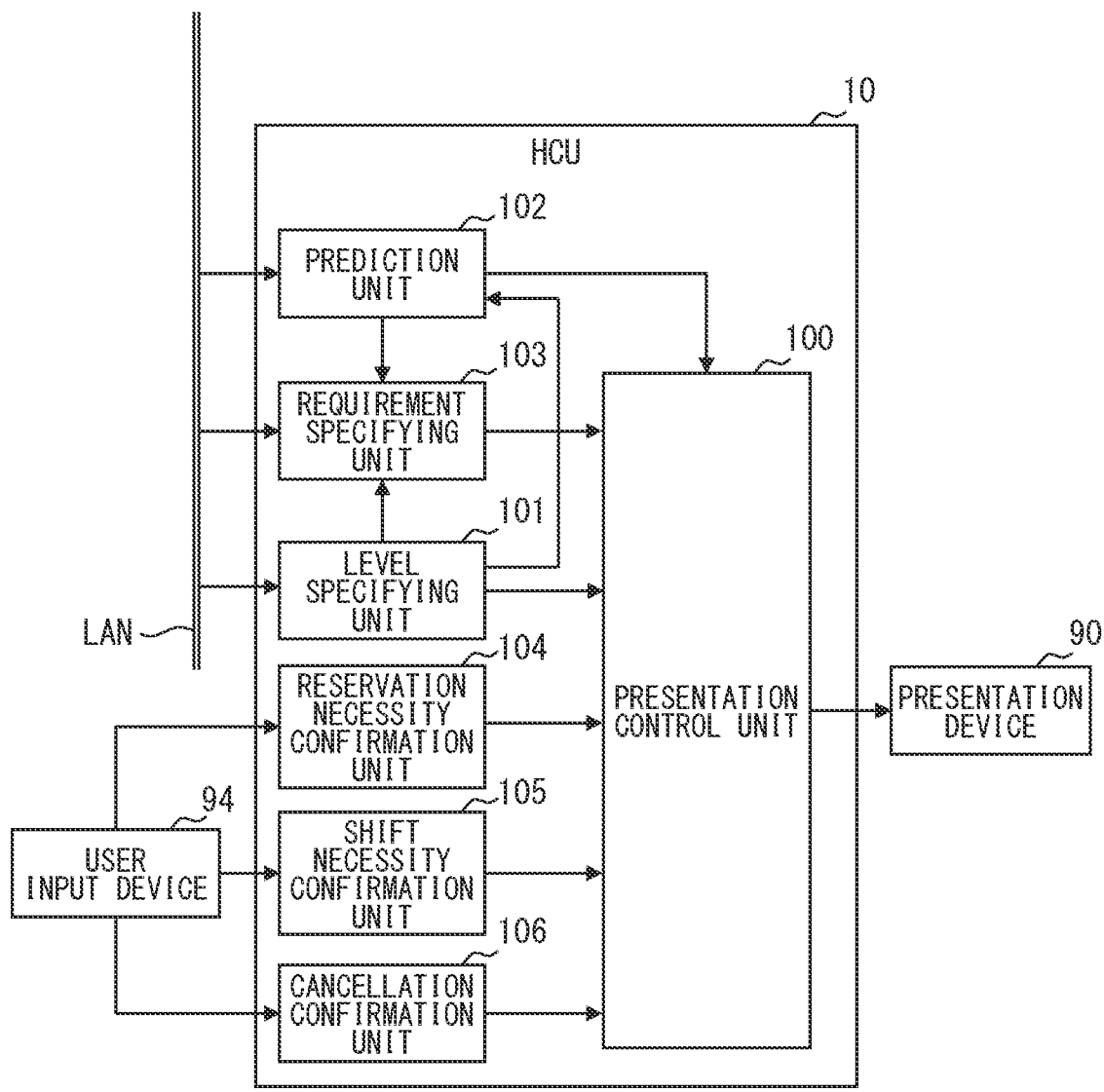
FIG. 2 is a diagram showing an example of a schematic configuration of an HCU 10.

Here, a schematic configuration of the HCU 10 will be described with reference to FIG. 2. As shown in FIG. 2, in relation to the control of the information presentation performed by the presentation device 90, the HCU 10 includes, as functional blocks, a presentation control unit 100, a level specifying unit 101, a prediction unit 102, a requirement specifying unit 103, a reservation necessity confirmation unit 104, a shift necessity confirmation unit 105, and a cancellation confirmation unit 106. Execution of processing of each functional block of the HCU performed by the computer corresponds to execution of a vehicle presentation control method. Some or all of functions executed by the HCU 10 may be configured as hardware by one or more ICs or the like. Some or all of the functional blocks of the HCU 10 may be implemented by execution of software performed by a processor and a combination of hardware members.

The level specifying unit 101 specifies an automation level of the subject vehicle at a current time. The level specifying unit 101 may specify the automation level of the subject vehicle at the current time by monitoring the autonomous driving ECU 80.

The prediction unit 102 predicts that autonomous driving will become possible. The autonomous driving being possible described here means arriving at a region in which the autonomous driving is permitted (hereinafter, referred to as an autonomous driving permission region). For example, regarding the autonomous driving at the area-limited LV3, the ST section may be set as the autonomous driving permission region. In this case, in other words, the prediction unit 102 predicts that the section requirement of the environmental requirement will be satisfied. Regarding the autonomous driving at the traffic congestion-limited LV3, a congested section may be set as the autonomous driving permission region. In this case, in other words, the prediction unit 102 predicts that a traffic congestion requirement of the environmental requirement will be satisfied. Regarding the autonomous driving at LV1 and LV2, an AD section may be set as the autonomous driving permission region. In this case, in other words, the prediction unit 102 further predicts that the section requirement of the environmental requirement will be satisfied.

Arriving at the autonomous driving permission region may be predicted in response that a distance to the autonomous driving permission region becomes equal to or lower than a set distance. When a prediction route of the subject vehicle is present, the arrival may be predicted in response that a distance to the autonomous driving permission region on the prediction route is equal to or lower than the set distance. The prediction route may be, for example, a route found by a navigation function. When no prediction route of the subject vehicle is present, the arrival may be predicted in response that the distance to the autonomous driving permission region is equal to or lower than the set distance on a road having no branch up to the autonomous driving permission region. The set distance may be set to any distance. In other words, the prediction unit 102 predicts that a predetermined requirement of at least a part of the environmental requirement will be satisfied. Examples of the predetermined requirement include the section requirement and the traffic congestion requirement described above.

The requirement specifying unit 103 specifies an AD start requirement to be satisfied to start the autonomous driving. That is, the AD start requirement that is not satisfied at the current time is specified. The requirement specifying unit 103 may specify the AD start requirement that is not satisfied at the current time based on the information used for the determination performed by the requirement determination unit of the autonomous driving ECU 80. The requirement specifying unit 103 at least distinguishes between the driver requirement and the environmental requirement and specifies the driver requirement and the environmental requirement as the AD start requirements. That is, a driver requirement and an environmental requirement that are not satisfied at a current time are distinguished and specified separately. The processing performed by the requirement specifying unit 103 corresponds to a requirement specifying step. The requirement specifying unit 103 may target the autonomous driving at the automation level predicted to be possible by the prediction unit 102. The requirement specifying unit 103 may specify whether all the AD start requirements are satisfied. The requirement specifying unit 103 may further specify whether all the driver requirements are satisfied. The requirement specifying unit 103 may further specify whether all the environmental requirements are satisfied.

The reservation necessity confirmation unit 104 confirms necessity of reservation as a response of the driver to reservation necessity presentation to be described later. For example, when the user input device 94 receives an input indicating that the reservation is necessary, the reservation necessity confirmation unit 104 confirms that the reservation is necessary. On the other hand, when the user input device 94 receives an input indicating that the reservation is not necessary, the reservation necessity confirmation unit 104 confirms that the reservation is not necessary. When the user input device 94 does not receive, within a predetermined time in response to reservation necessity presentation, the input indicating that the reservation is necessary, the reservation necessity confirmation unit 104 may confirm that the reservation is not necessary. A case where the reservation necessity confirmation unit 104 confirms that reservation for a shift to the autonomous driving is necessary corresponds to a case where the agreement of the driver described above is given.

The shift necessity confirmation unit 105 confirms necessity of shift as a response of the driver to shift necessity presentation to be described later. For example, when the user input device 94 receives an input indicating that the shift is necessary, the shift necessity confirmation unit 105 confirms that the shift is necessary. On the other hand, when the user input device 94 receives an input indicating that the shift is not necessary, the shift necessity confirmation unit 105 confirms that the shift is not necessary. When the user input device 94 does not receive, within a predetermined time in response to the shift necessity presentation, the input indicating that the shift is necessary, the shift necessity confirmation unit 105 may confirm that the shift is not necessary. A case where the shift necessity confirmation unit 105 confirms that shift to the autonomous driving is necessary corresponds to a case where the agreement of the driver described above is given.

The cancellation confirmation unit 106 confirms necessity of cancellation as a response of the driver to cancellation necessity presentation to be described later. For example, when the user input device 94 receives an input indicating that cancellation is necessary, the cancellation confirmation unit 106 confirms that the cancellation is necessary. On the other hand, when the user input device 94 receives an input indicating that the cancellation is not necessary, the cancellation confirmation unit 106 confirms that the cancellation is not necessary. When the user input device 94 does not receive, within a predetermined time in response to the cancellation necessity presentation, the input indicating that the cancellation is necessary, the cancellation confirmation unit 106 may confirm that the cancellation is not necessary. A case where the cancellation confirmation unit 106 confirms that the cancellation is not necessary corresponds to a case where the agreement of the driver described above is given.

The presentation control unit 100 controls the information presentation performed by the presentation device 90. Hereafter, a case where the presentation control unit 100 controls the information presentation to be performed by display on the display device 91 will be described as an example. The information presentation may be performed by outputting a sound from the audio output device 92.

The presentation control unit 100 controls, in response that the AD start requirement specified by the requirement specifying unit 103 is the driver requirement, driver requirement presentation indicating that the driver requirement is necessary for the start of the autonomous driving to be performed before the autonomous driving is started as information presentation related to a requirement necessary for starting the autonomous driving (hereinafter, referred to as requirement presentation). That is, the presentation control unit 100 controls the driver requirement presentation related to a driver requirement that is not satisfied with respect to the autonomous driving as a switching target to be performed before the autonomous driving is started. The driver requirement presentation may be information presentation indicating the driver requirement that is not satisfied. For example, a list of driver requirements that are not satisfied may be displayed by a text or an icon. The driver requirement presentation may be information presentation that prompts the driver to satisfy the driver requirement that is not satisfied. For example, a text describing that the autonomous driving is possible when the driver requirements that are not satisfied are satisfied may be displayed together with the list of driver requirements. A text describing that the autonomous driving is not possible when the driver requirements that are not satisfied are not satisfied may be displayed together with the list of driver requirements. The processing performed by the presentation control unit 100 corresponds to a presentation control step.

When the requirement specifying unit 103 specifies the environmental requirement as the AD start requirement, the presentation control unit 100 may be also configured not to control information presentation indicating that the environmental requirement is necessary for the start of the autonomous driving to be performed as the requirement presentation. That is, when an environmental requirement that is not satisfied with respect to the autonomous driving as the switching target is specified, the presentation control unit 100 may be also configured not to control information presentation indicating that the environmental requirement is necessary for the start of the autonomous driving to be performed. The presentation control unit 100 may be configured to control the driver requirement presentation to be performed when the AD start requirement specified by the requirement specifying unit 103 is the driver requirement, and not to control, when the AD start requirement specified by the requirement specifying unit 103 is only the environmental requirement, the information presentation indicating that the environmental requirement is necessary for the start of the autonomous driving to be performed. Even when information presentation indicating that an environmental requirement which cannot be solved by the driver is necessary is performed, the driver is highly likely to get annoyed. In contrast, by not performing such information presentation, it is possible to make it less likely for the driver to get annoyed.

It is preferable that when the prediction unit 102 predicts that the predetermined requirement described above of the environmental requirement will be satisfied, the presentation control unit 100 controls the driver requirement presentation to be performed before the predetermined requirement is satisfied in response that the AD start requirement specified by the requirement specifying unit 103 is the driver requirement. That is, it is preferable that when the prediction unit 102 predicts that the autonomous driving will become possible, the presentation control unit 100 controls the driver requirement presentation to be performed before all the environmental requirements are satisfied. Accordingly, it is possible to prompt the driver to satisfy the driver requirement with a margin before arriving at the autonomous driving permission region.

When the prediction unit 102 predicts that the predetermined requirement described above will be satisfied, the presentation control unit 100 may control information presentation for inquiring the driver about the necessity of the reservation for the shift to the autonomous driving (hereinafter, referred to as reservation necessity presentation) to be performed. A timing of the reservation necessity presentation when the autonomous driving as the switching target is the autonomous driving at Level 3 will be described.

For example, the presentation control unit 100 may be configured not to control the reservation necessity presentation to be performed until the subject vehicle arrives at the AD section. This is to prevent the reservation necessity presentation from being performed unnecessarily on a general road that is considered to be less likely to satisfy the AD start requirement of the autonomous driving at LV3. The presentation control unit 100 may be configured to control the reservation necessity presentation to be performed before a service area when the requirement specifying unit 103 specifies an energy requirement. That is, the presentation control unit 100 may be configured to control the reservation necessity presentation to be performed before the service area when the remaining amount of the traveling energy source of the subject vehicle is insufficient. Accordingly, it is possible to control driver requirement presentation indicating that the energy requirement is not satisfied before the service area to be performed and to provide an opportunity to replenish the traveling energy source of the subject vehicle.

It is preferable that the presentation control unit 100 changes the timing of causing the reservation necessity presentation to be performed according to whether the autonomous driving in which the prediction unit 102 predicts that the predetermined requirement described above will be satisfied is the autonomous driving at the area-limited LV3 (hereinafter, referred to as area-limited autonomous driving) or the autonomous driving at the traffic congestion-limited LV3 (hereinafter, referred to as traffic congestion-limited autonomous driving). Accordingly, it is possible to control the reservation necessity presentation to be performed according to a timing at which the possibility that the autonomous driving becomes possible increases in each of the area-limited autonomous driving and the traffic congestion-limited autonomous driving. When the area-limited autonomous driving is a target, the reservation necessity presentation may be performed at a point that is at a predetermined distance before the ST section. The predetermined distance may be, for example, 2 km. When the traffic congestion-limited autonomous driving is a target, the reservation necessity presentation may be performed at a point that is at a predetermined distance before the congested section that can be specified based on traffic congestion information. The predetermined distance may be, for example, 2 km. When the traffic congestion-limited autonomous driving is a target, the reservation necessity presentation may be performed at a point at which the subject vehicle arrives at the AD section and the vehicle speed of the subject vehicle is equal to or lower than a predetermined value. The predetermined value may be, for example, 40 km/h.

When the autonomous driving as the switching target is the autonomous driving at Level 2 or lower, the following may be performed. For example, the presentation control unit 100 may control the reservation necessity presentation to be performed immediately after the prediction unit 102 predicts that the predetermined requirement described above will be satisfied. The presentation control unit 100 may control the reservation necessity presentation to be performed after a predetermined time from when the prediction unit 102 predicts that the predetermined requirement described above will be satisfied. The predetermined time may be, for example, a time estimated to be shorter than a time until arriving at the autonomous driving permission region.

It is preferable that the presentation control unit 100 controls the driver requirement presentation to be performed when the reservation necessity confirmation unit 104 confirms that the reservation for the shift to the autonomous driving is necessary and the AD start requirement specified by the requirement specifying unit 103 is the driver requirement. Accordingly, it is possible to indicate, for the driver who wants to perform the shift to the autonomous driving in advance, the driver requirement to be satisfied by the driver to enable the autonomous driving before the subject vehicle arrives at the autonomous driving permission region. Therefore, the shift to the autonomous driving can be performed more smoothly.

It is preferable that the presentation control unit 100 changes, according to the driver requirement specified by the requirement specifying unit 103, at least one of a timing of causing the driver requirement presentation to be performed and an order of the driver requirement presentation for a plurality of types of the driver requirements when the plurality of types of driver requirements are specified. Depending on the type of the driver requirement, a time required until the requirement is satisfied may be different. In contrast, according to the above configuration, it is possible to control the driver requirement presentation to be performed at a timing corresponding to the time required until the driver requirement is satisfied. As a result, it is possible to smoothly perform an action that the driver satisfies the driver requirement.

For example, when a plurality of types of driver requirements are specified, the presentation control unit 100 may control the driver requirement presentation for each of the driver requirements to be performed in an order of difficulty in satisfying the requirements. This is because the time required to satisfy the requirement becomes longer and earlier presentation is preferable as the requirement is more difficult to satisfy. As an example, when the traveling lane requirement, the energy requirement, and the autonomous mode requirement are specified by the requirement specifying unit 103, the driver requirement presentation for each of the driver requirements may be performed in an order of the energy requirement, the traveling lane requirement, and the autonomous mode requirement.

The presentation control unit 100 may control the driver requirement presentation to be performed at a timing corresponding to an estimated time required until the requirements are satisfied. This is because presentation is preferably earlier as the time required to satisfy the requirement becomes longer. As an example, in a case of the energy requirement, the driver requirement presentation may be performed at a timing before arriving at the service area before the ST section. When the autonomous driving as the switching target is the area-limited autonomous driving and the traveling lane requirement is specified by the requirement specifying unit 103, the driver requirement presentation may be performed when arriving at a point at a predetermined distance before the ST section. The predetermined distance may be, for example, 2 km. For requirements that the driver can quickly respond to, such as, the autonomous mode requirement, the vehicle speed requirement, the vehicle-to-vehicle distance requirement, the driver state requirement, and the grasp requirement, the driver requirement presentation may be performed immediately before arriving at the autonomous driving permission region. In a case of the level requirement, the lower a current automation level than a necessary automation level, the earlier the driver requirement presentation may be performed.

The driver requirement presentation for each of the driver requirements may be performed by displaying driver requirements that are not satisfied in a list and highlighting a driver requirement at a timing corresponding to each of the driver requirements. The driver requirements that are not satisfied may not be displayed in the list, and only the driver requirement may be displayed at the timing corresponding to each of the driver requirements.

The presentation control unit 100 may control information presentation for inquiring the driver about the necessity of the shift to the autonomous driving (hereinafter, referred to as shift necessity presentation) to be performed. In other words, the necessity of the shift can be reworded as whether there is a request for shift. The presentation control unit 100 may be configured not to control the shift necessity presentation to be performed when the reservation necessity confirmation unit 104 confirms that the reservation for the shift to the autonomous driving is necessary. This is to prevent the driver from being annoyed caused by confirming the request for the shift to the autonomous driving many times. The presentation control unit 100 may be configured to control the shift necessity presentation to be performed without performing the reservation necessity presentation.

It is preferable that the presentation control unit 100 controls the driver requirement presentation to be performed when the AD start requirement specified by the requirement specifying unit 103 is only the driver requirement of the driver requirement and the environmental requirement and the shift necessity confirmation unit 105 confirms that the shift to the autonomous driving is necessary. Accordingly, it is possible to control the driver requirement presentation to be performed when the driver requests to perform the shift to the autonomous driving. When the AD start requirement includes the environmental requirement, the driver requirement presentation is not performed. Therefore, when the autonomous driving cannot be performed by only satisfying the driver requirement, it is possible to eliminate waste of performing the driver requirement presentation.

When the reservation necessity confirmation unit 104 confirms that the reservation for the shift to the autonomous driving is necessary, the presentation control unit 100 may be configured not to control the shift necessity presentation to be performed even when all the AD start requirements are satisfied and the shift to the autonomous driving is to be performed. Accordingly, it is possible to prevent the annoyance of performing the shift necessity presentation even though the driver confirms that the reservation for the shift is necessary. On the other hand, when the reservation necessity confirmation unit 104 confirms that the reservation for the shift to the autonomous driving is not necessary, the shift necessity presentation may be performed when all the AD start requirements are satisfied. Accordingly, even when the driver cannot confirm that the shift is necessary in the reservation necessity presentation, the driver can confirm whether the shift is necessary before the shift to the autonomous driving is performed.

It is preferable that the presentation control unit 100 changes the timing of causing the driver requirement presentation to be performed according to whether the reservation necessity confirmation unit 104 confirms that the reservation for the shift to the autonomous driving is necessary or confirms that the reservation for the shift to the autonomous driving is not necessary. Accordingly, it is possible to control the driver requirement presentation to be performed at a timing at which it can be confirmed that the driver requests to perform the shift to the autonomous driving. Therefore, it is possible to prevent waste of performing the driver requirement presentation at a timing at which the driver is not necessary. For example, when the reservation necessity confirmation unit 104 confirms that the reservation for the shift to the autonomous driving is necessary, the driver requirement presentation is performed after the reservation for the shift is confirmed. As an example, as described above, the driver requirement presentation may be performed at a timing corresponding to the driver requirement to be satisfied. On the other hand, when the reservation necessity confirmation unit 104 confirms that the reservation for the shift to the autonomous driving is not necessary, the driver requirement presentation may be performed at the same timing as that of the shift necessity presentation.

The presentation control unit 100 may control information presentation for inquiring the driver about the necessity of cancellation of the shift to the autonomous driving (hereinafter, referred to as cancellation necessity presentation) to be performed. The presentation control unit 100 may be configured to perform the cancellation necessity presentation only when the reservation necessity confirmation unit 104 confirms that the reservation for the shift to the autonomous driving is necessary. This is to provide an opportunity to confirm whether to confirm the reservation.

It is preferable that the presentation control unit 100 controls the driver requirement presentation to be performed when the AD start requirement specified by the requirement specifying unit 103 is only the driver requirement of the driver requirement and the environmental requirement, and does not control the driver requirement presentation to be performed when the AD start requirement specified by the requirement specifying unit 103 includes the environmental requirement. Accordingly, it is possible to eliminate waste of performing the driver requirement presentation when the autonomous driving cannot be performed by only satisfying the driver requirement.

When the requirement specifying unit 103 does not specify the driver requirement as the AD start requirement, it is preferable that the presentation control unit 100 changes a mode of the information presentation according to whether the environmental requirement is specified. For example, the presence or absence of the information presentation may be changed. As an example, the following may be performed. Regarding a case where it is confirmed that the reservation for the shift is necessary, when all the driver requirements are satisfied and all the environmental requirements are also satisfied, the cancellation necessity presentation may be performed. On the other hand, when all the driver requirements are satisfied but the environmental requirements are not satisfied, the cancellation necessity presentation may not be performed. Regarding a case where it is confirmed that the reservation for the shift is not necessary, when all the driver requirements are satisfied and all the environmental requirements are also satisfied, the shift necessity presentation may be performed. On the other hand, when all the driver requirements are satisfied but the environmental requirements are not satisfied, the shift necessity presentation may not be performed.

It is preferable that the presentation control unit 100 also controls information presentation indicating a current state in a stage until the autonomous driving becomes possible to be performed. For example, the information presentation indicating the current state in the stage until the autonomous driving as the switching target becomes possible may be also performed. As an example, the following may be performed.

When the reservation necessity confirmation unit 104 confirms that the reservation for the shift to the autonomous driving is necessary, the presentation control unit 100 may control the display device 91 to display an icon indicating that the reservation for the shift to the autonomous driving is in progress (hereinafter, referred to as an in-reservation icon). When it is confirmed that the reservation for the shift to the autonomous driving is necessary and all the AD start requirements are satisfied, the presentation control unit 100 may control the display device 91 to display an icon indicating that preparation for the reservation for the shift to the autonomous driving is completed (hereinafter, referred to as a reservation preparation completion icon). The in-reservation icon may be continuously displayed until the reservation preparation completion icon is displayed. When a configuration in which the reservation preparation completion icon is not displayed is adopted, for example, the in-reservation icon may be continually displayed until the cancellation confirmation unit 106 confirms the necessity for the cancellation. On the other hand, when it is confirmed that the reservation for the shift to the autonomous driving is necessary and the AD start requirements are not satisfied, the presentation control unit 100 may control the display device 91 to display an icon indicating that the preparation for the reservation for the shift to the autonomous driving is not completed (hereinafter, referred to as a reservation preparation incompletion icon). The reservation preparation incompletion icon may be displayed instead of the in-reservation icon or may be displayed together with the in-reservation icon.

The presentation control unit 100 may control the display device 91 to display texts such as "autonomous driving is impossible" and "LVX is impossible" until all the AD start requirements of the autonomous driving as the switching target are satisfied. An automation level of the autonomous driving as the switching target may be applied to X in the LVX.

The presentation control unit 100 may change the mode of information presentation according to whether the reservation necessity confirmation unit 104 confirms that the reservation for the shift to the autonomous driving is necessary. As an example, the following may be performed.

When it is confirmed that the reservation for the shift to the autonomous driving is necessary and all the AD start requirements are satisfied, the presentation control unit 100 may be configured not to control the shift necessity presentation to be performed. In this case, the shift to the autonomous driving as the switching target is performed without confirming that the shift is necessary. However, it is preferable that the shift to the autonomous driving can be canceled by performing the cancellation necessity presentation. On the other hand, when it is confirmed that the reservation for the shift to the autonomous driving is not necessary, the shift necessity presentation may be performed and the necessity for the shift may be confirmed. When only the driver requirements of the AD start requirements are not satisfied, the driver requirement presentation that prompts the driver to satisfy the driver requirements that are not satisfied may be performed.

When the prediction unit 102 predicts that the autonomous driving will become possible, the presentation control unit 100 may control information presentation for notifying a possibility that the autonomous driving becomes possible (hereinafter, referred to as possibility presentation) to be performed. As an example, the following may be performed. When the autonomous driving as the switching target is the area-limited autonomous driving, the display device 91 may display a text such as "there is an autonomous drivable area ahead". When the autonomous driving as the switching target is the traffic congestion-limited autonomous driving, the display device 91 may display a text such as "there is a possibility that traffic congested time autonomous driving can be performed ahead".

When the requirement specifying unit 103 specifies only the driver requirement of the driver requirement and the environmental requirement, the presentation control unit 100 may control information presentation indicating that the autonomous driving as the switching target is possible when the driver requirement is satisfied (hereinafter, referred to as driver requirement waiting presentation) to be performed. As an example, the display device 91 may display a text such as "the autonomous driving is possible when the requirement is satisfied". The driver requirement waiting presentation does not include information presentation indicating the driver requirement that is not satisfied.

When the shift to the autonomous driving as the switching target is to be performed, the presentation control unit 100 may control information presentation indicating shifting to the autonomous driving as the switching target (hereinafter, referred to as shift presentation) to be performed. As an example, the display device 91 may display a text such as "shift to autonomous driving".

(Presentation Control-Related Processing by HCU 10)

Figure 3:
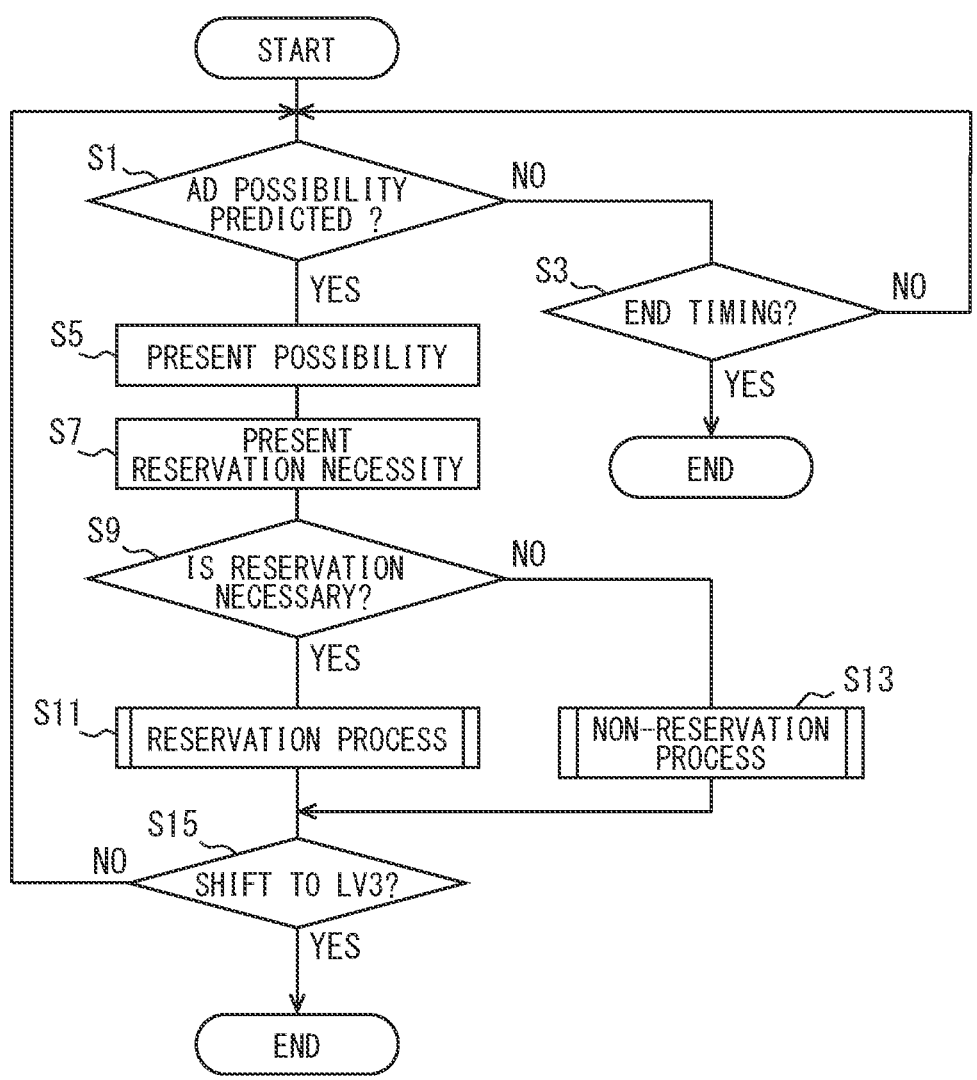
FIG. 3 is a flowchart showing an example of a flow of presentation control-related processing performed by the HCU 10.
Figure 4:
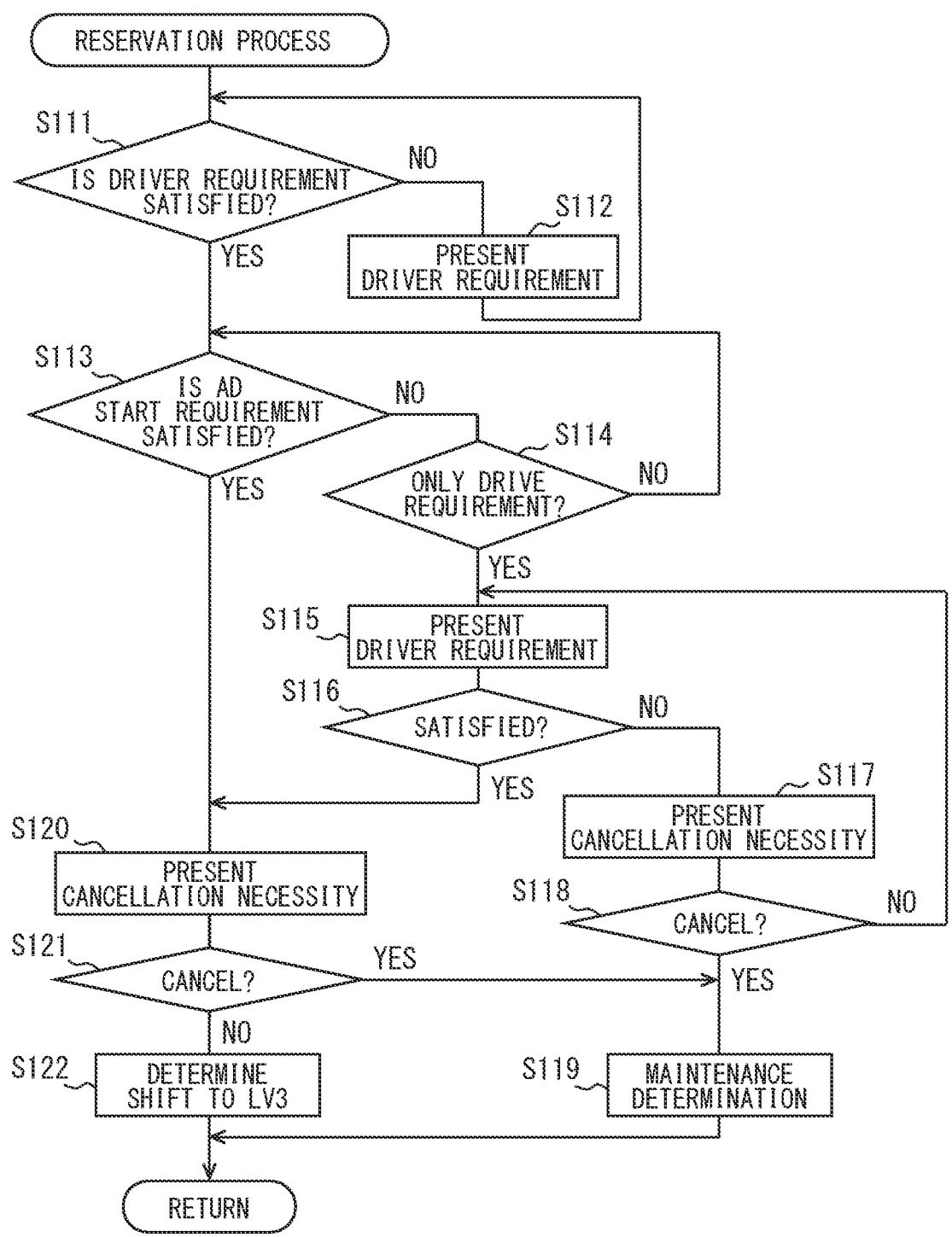
FIG. 4 is a flowchart showing an example of a flow of reservation process performed by the HCU 10.

Here, with reference to flowcharts shown in FIGS. 3 to 5, an example of a flow of processing related to control of the information presentation related to the shift to the autonomous driving performed by the HCU 10 (hereinafter, referred to as a presentation control-related processing) will be described. An example of a case where the autonomous driving as the switching target is the autonomous driving at LV3 will be described. The flowchart shown in FIG. 3 may start, for example, when a switch for starting an internal combustion engine or a motor generator of the subject vehicle (hereinafter, referred to as a power switch) is turned on.

First, in step S1, when the prediction unit 102 predicts that the autonomous driving will become possible (hereinafter, referred to as an AD possibility) (YES in S1), the process proceeds to step S5. On the other hand, when the AD possibility is not predicted (NO in S1), the process proceeds to step S3. In step S3, when this is an end timing of the presentation control-related processing (YES in S3), the presentation control-related processing is ended. On the other hand, when this is not the end timing of the presentation control-related processing (NO in S3), the process returns to S1 and the processing is repeated. Examples of the end timing of the presentation control-related processing include that the power switch is turned off.

In step S5, the presentation control unit 100 controls the possibility presentation to be performed, and the process proceeds to step S7. In step S7 the presentation control unit 100 controls the reservation necessity presentation to be performed, and the process proceeds to step S9. In step S9, when the reservation necessity confirmation unit 104 confirms that the reservation is necessary (YES in S9), the process proceeds to step S11. On the other hand, when the reservation necessity confirmation unit 104 confirms that the reservation is not necessary (NO in S9), the process proceeds to step S13.

In step S11, reservation process is performed, and the process proceeds to step S15. An example of a flow of the reservation process will be described with reference to the flowchart shown in FIG. 4.

First, in step S111, when the requirement specifying unit 103 specifies that all the driver requirements are satisfied (YES in S111), the process proceeds to step S113. On the other hand, when the requirement specifying unit 103 specifies that the driver requirements are not satisfied (NO in S111), the process proceeds to step S112.

In step S112, the presentation control unit 100 controls the driver requirement presentation to be performed, and the process returns to step S111 and the processing is repeated. In S112, when there are a plurality of types of driver requirements that are not satisfied, as described above, the driver requirement presentation may be performed for each of the driver requirements at a timing corresponding to each of the driver requirements. In this case, as the number of the driver requirements satisfied increases, the number of the driver requirements indicated by the driver requirement presentation decreases.

In step S113, when the requirement specifying unit 103 specifies that all the AD start requirements are satisfied (YES in S113), the process proceeds to step S120. On the other hand, when the requirement specifying unit 103 specifies that the AD start requirements are not satisfied (NO in S113), the process proceeds to step S114.

In step S114, when the requirement specifying unit 103 specifies only the driver requirement of the driver requirement and the environmental requirement (YES in S114), the process proceeds to step S115. On the other hand, when the requirement specifying unit 103 also specifies the environmental requirement (NO in S114), the process returns to S113 and the processing is repeated.

In step S115, the presentation control unit 100 controls the driver requirement presentation to be performed, and the process proceeds to step S116. In step S116, when the requirement specifying unit 103 specifies that all the driver requirements are satisfied (YES in S116), the process proceeds to step S120. On the other hand, when the requirement specifying unit 103 specifies that the driver requirements are not satisfied (NO in S116), the process proceeds to step S117.

In step S117, the presentation control unit 100 controls the cancellation necessity presentation to be performed, and the process proceeds to step S118. In step S118, when the cancellation confirmation unit 106 confirms that the cancellation is necessary (YES in S118), the process proceeds to step S119. On the other hand, when the cancellation confirmation unit 106 confirms that the cancellation is not necessary (NO in S118), the process returns to 3115 and the processing is repeated. In step S119, the HCU 10 determines that the subject vehicle maintains the current automation level, and the process proceeds to step S15.

In step S120, the presentation control unit 100 controls the Cancellation necessity presentation to be performed, and the process proceeds to step S121. In step S121, when the cancellation confirmation unit 106 confirms that the cancellation is necessary (YES in S121), the process proceeds to step S119. On the other hand, when the cancellation confirmation unit 106 confirms that the cancellation is not necessary (NO in S121), the process proceeds to step S122. In step S122, the HCU determines that the subject vehicle shifts to the autonomous driving at LV3, and the process proceeds to step S15. Accordingly, even in a state in which the driver reserves the shift to the autonomous driving in advance, the request to shift can be confirmed before the shift to the autonomous driving as the switching target.

In S120, the presentation control unit 100 may also control the shift presentation indicating shifting to the autonomous driving as the switching target to be performed. The presentation control unit 100 may be configured to control the information presentation indicating shifting to the autonomous driving as the switching target to be performed instead of the cancellation necessity presentation. In this case, shifting to the autonomous driving as the switching target without confirming the necessity of the cancellation is performed.

Returning to FIG. 3, in step S13, non-reservation process is performed, and the process proceeds to step S15. An example of a flow of the non-reservation process will be described with reference to the flowchart shown in FIG. 5.

In step S131, when the requirement specifying unit 103 specifies that all the AD start requirements are satisfied (YES in S131), the process proceeds to step S132. On the other hand, when the requirement specifying unit 103 specifies that the AD start requirements are not satisfied (NO in S131), the process proceeds to step S135.

In step S132 the presentation control unit 100 controls the shift necessity presentation to be performed, and the process proceeds to step S133. In step S133, when the shift necessity confirmation unit 105 confirms that the shift is necessary (that is, shift is requested) (YES in S133), the process proceeds to step S134. On the other hand, when the shift necessity confirmation unit 105 confirms that the shift is not necessary (NO in S133), the process proceeds to step S139.

In step S134, the HCU 10 determines that the subject vehicle shifts to the autonomous driving at LV3. In S134, the presentation control unit 100 controls the shift presentation indicating shifting to the autonomous driving as the switching target to be performed, and the process proceeds to step S15.

In step S135, when the requirement specifying unit 103 specifies only the driver requirement of the driver requirement and the environmental requirement (YES in S135), the process proceeds to step S136. On the other hand, when the requirement specifying unit 103 also specifies the environmental requirement (NO in S135), the process returns to S131 and the processing is repeated. In step S136, the presentation control unit 100 controls the driver requirement waiting presentation indicating that the autonomous driving as the switching target is possible when the driver requirements are satisfied to be performed, and the process proceeds to step S137.

In step S137, the presentation control unit 100 controls the shift necessity presentation to be performed, and the process proceeds to step S138. In step S138, when the shift necessity confirmation unit 105 confirms that the shift is necessary (that is, shift is requested) (YES in S138), the process proceeds to step S140. On the other hand, when the shift necessity confirmation unit 105 confirms that the shift is not necessary (NO in S138), the process proceeds to step S139. In step S139, the HCU 10 determines that the subject vehicle maintains the current automation level, and the process proceeds to step S15.

Figure 5:
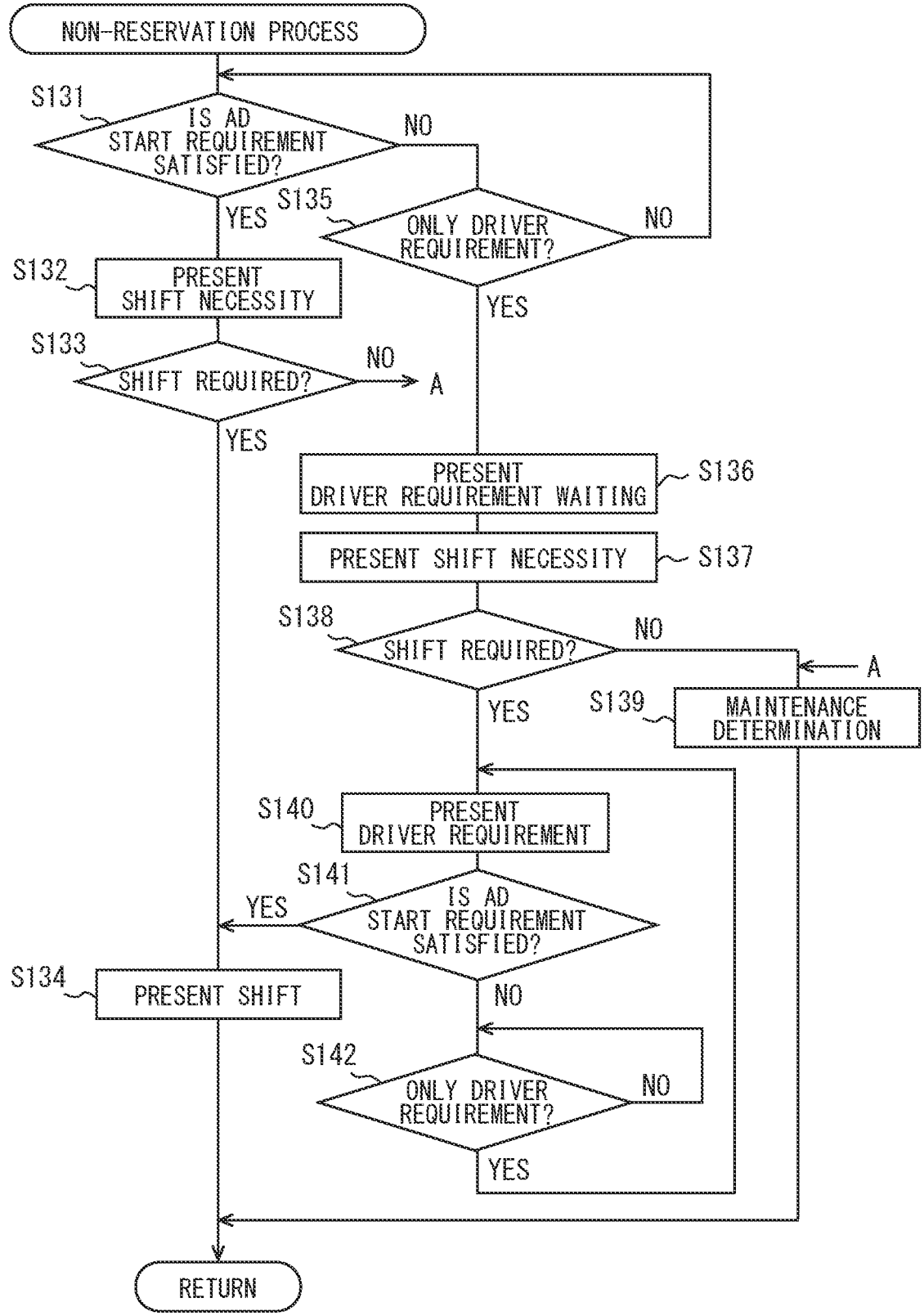
FIG. 5 is a flowchart showing an example of a flow of non-reservation process performed by the HCU 10.

In the example shown in FIG. 5, the driver requirement presentation is not performed before confirming the shift request. Accordingly, it is possible to prevent the annoyance caused by performing the presentation of the requirement to be satisfied by the driver for starting the autonomous driving even though the driver does not request to perform the shift to the autonomous driving.

In step S140, the presentation control unit 100 controls the driver requirement presentation to be performed, and the process proceeds to step S141. In step S141, when the requirement specifying unit 103 specifies that all the AD start requirements are satisfied (YES in S141), the process proceeds to step S134. On the other hand, when the requirement specifying unit 103 specifies that the AD start requirements are not satisfied (NO in S141), the process proceeds to step S142.

In step S142, when the requirement specifying unit 103 specifies only the driver requirement of the driver requirement and the environmental requirement (YES in S142), the process proceeds to step S140 and the processing is repeated. On the other hand, when the requirement specifying unit 103 also specifies the environmental requirement (NO in S142), the processing of S142 is repeated.

Returning to FIG. 3, in step S15, when the HCU 10 determines that the subject vehicle shifts to the autonomous driving at LV3 (YES in S15), the presentation control-related processing is ended. On the other hand, when the HCU determines that the subject vehicle maintains the current automation level (NO in S15), the process returns to S1 and the processing is repeated.

SUMMARY OF THE FIRST EMBODIMENT

According to the configuration of the first embodiment, in response that the requirement necessary for starting the autonomous driving is the driver requirement, it is possible to control the driver requirement presentation indicating that the driver requirement is necessary for the start of the autonomous driving to be performed. Therefore, it is possible to perform information presentation in response that the requirement necessary for starting the autonomous driving is a driver requirement. The driver requirement presentation is performed before the autonomous driving is started. Therefore, based on the driver requirement presentation, it is possible to prompt the driver to take a measure necessary for starting the autonomous driving before the start of the autonomous driving. As a result, it is possible to smoothly switch from manual driving to autonomous driving.

In the first embodiment, the case where the autonomous driving as the switching target is the autonomous driving at LV3 is mainly described as an example, and the disclosure is not limited thereto. The disclosure is also applicable to a case where the autonomous driving as the switching target is autonomous driving at levels other than LV3.

SECOND EMBODIMENT

The first embodiment shows a configuration in which in the non-reservation process, the shift necessity presentation is performed before the driver requirement presentation is performed, and the shift request of the driver is confirmed. The disclosure is not necessarily limited thereto. For example, a configuration as in the following the second embodiment may be adopted. Hereinafter, an example of the second embodiment will be described with reference to the drawings. The vehicle system 1 according to the second embodiment is similar to the vehicle system 1 according to the first embodiment except that an HCU is included instead of the HCU 10.

Figure 6:
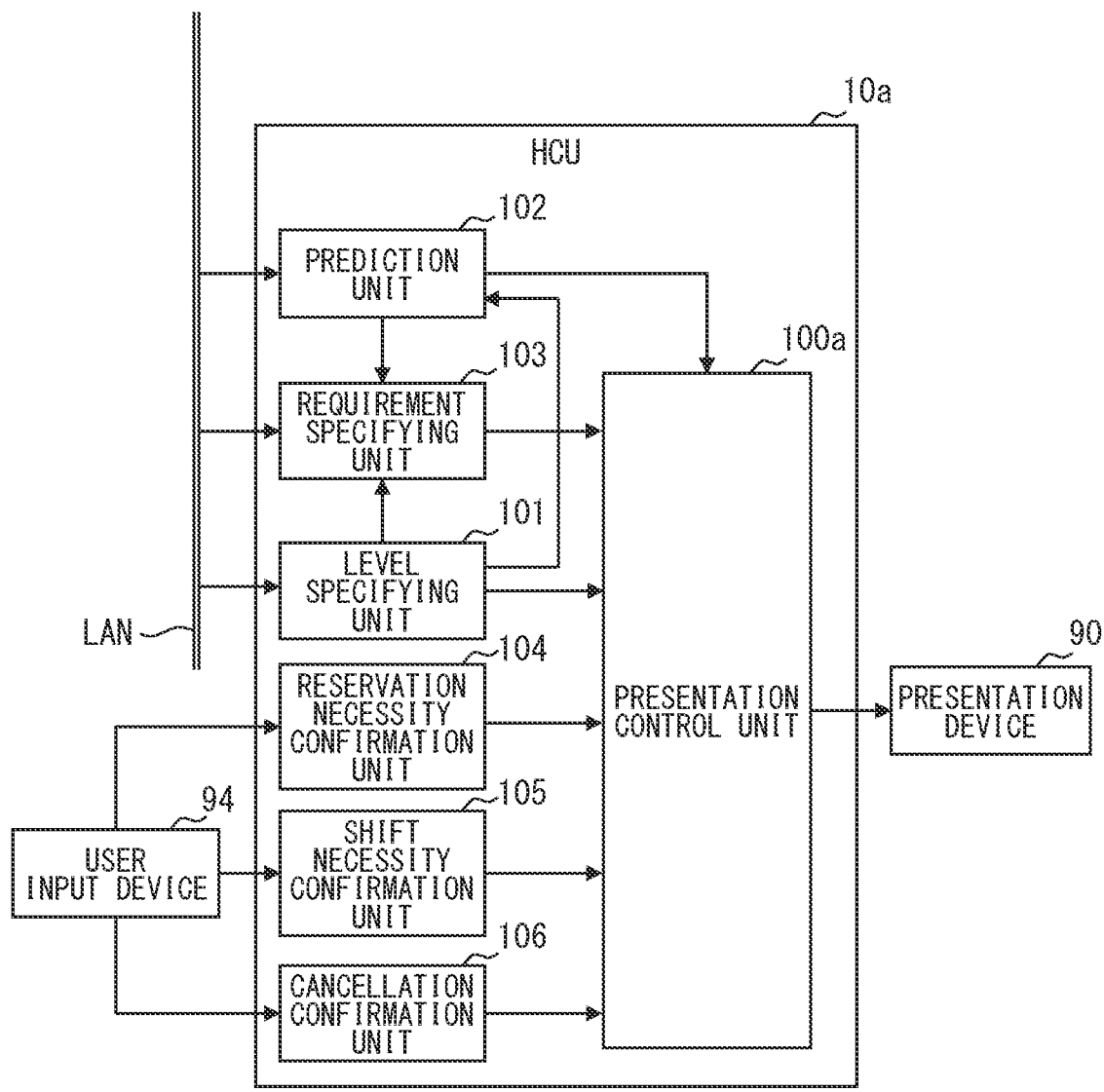

Subsequently, a schematic configuration of the HCU 10a will be described with reference to FIG. 6. As shown in FIG. 6, in relation to the control of the information presentation performed by the presentation device 90, the HCU 10a includes, as functional blocks, a presentation control unit 100a, the level specifying unit 101, the prediction unit 102, the requirement specifying unit 103, the reservation necessity confirmation unit 104, the shift necessity confirmation unit 105, and the cancellation confirmation unit 106. The HCU 10a is similar to the HCU 10 according to the first embodiment except that the presentation control unit 100a is included instead of the presentation control unit 100. The HCU 10a also corresponds to the vehicle presentation control device. Execution of processing of each functional block of the HCU 10a performed by the computer also corresponds to the execution of the vehicle presentation control method.

The presentation control unit 100a is similar to the presentation control unit 100 according to the first embodiment except that a part of the processing related to the non-reservation process is different. When the AD start requirement specified by the requirement specifying unit 103 is only the driver requirement of the driver requirement and the environmental requirement, the presentation control unit 100a also controls the driver requirement presentation to be performed when the shift necessity presentation is performed. Details will be described below. Hereafter, an example of a flow of the non-reservation process performed by the HCU 10a will be described with reference to a flowchart shown in FIG. 7.

Processing of S131 to S136 may be similar to that in the non-reservation process according to the first embodiment. A difference is that processing of step S137a is performed following the processing of step S136. In step S137a, the presentation control unit 100 controls the driver requirement presentation to be performed together with the shift necessity presentation, and the process proceeds to step S138. The driver requirement presentation here may indicate the driver requirements that are not satisfied by, for example, a list. Processing of S138 to S142 may be similar to that in the non-reservation process according to the first embodiment. In the driver requirement presentation, as a display method other than the list display of indicating by the list, the following may be performed. For example, one driver requirement that requires the longest time to satisfy the requirement may be displayed, and every time the driver requirement is satisfied, the driver requirement to be displayed may be displayed by changing in an order of required time. When the list display is performed, of the driver requirements that are not satisfied, a plurality of requirements which require time to satisfy the driver requirements may be displayed, and every time the driver requirements are satisfied, the driver requirements may be switched to the other driver requirements that are not satisfied and displayed. The driver requirement presentation may not be text display, but may be icon display, or may be presentation performed by sound.

According to the above configuration, it is possible to determine whether the driver shifts to the autonomous driving after confirming the number of the driver requirements to be satisfied. In the flowchart shown in FIG. 7, for example, the processing of S136 may be omitted. The same applies to the flowchart shown in FIG. 6.

THIRD EMBODIMENT

The embodiments described above show a configuration in which the shift to the autonomous driving can be reserved in advance, and the disclosure is not limited thereto. The shift to the autonomous driving may not be reserved in advance. In this case, the processing of S7, S9, and S11 in the flowchart shown in FIG. 3 may be omitted, and the processing of S13 may be performed following the processing of S5. A configuration may be formed in which the reservation can be performed when the autonomous driving as the switching target is the area-limited autonomous driving, and the reservation cannot be performed when the switching target autonomous driving is the traffic congestion-limited autonomous driving. This is because it is difficult to predict a timing at which the environmental requirement is satisfied in the traffic congestion-limited autonomous driving.

When a configuration is adopted in which the automation level can be shifted to LV3 only from a state of LV2, in a condition that the automation level of the subject vehicle is equal to or lower than LV1, the presentation control units 100, 100a may control the reservation necessity presentation to be performed, the necessity of the reservation is confirmed, and processing according to the necessity is performed. This is because the driver can satisfy the driver requirements with a margin.

FOURTH EMBODIMENT

When the presentation control units 100, 100a control the shift necessity presentation to be performed, predicted duration of the autonomous driving as the switching target may also be presented. A predicted continuous distance of the autonomous driving as the switching target may be presented. When the autonomous driving as the switching target is the area-limited autonomous driving, the predicted duration and the predicted continuous distance may be estimated based on a length of the ST section. For example, the predicted duration may be estimated based on the length of the ST section and an average vehicle speed of the subject vehicle. When the autonomous driving as the switching target is the traffic congestion-limited autonomous driving, the predicted duration and the predicted continuous distance may be estimated based on a length of the congested section that can be specified based on the traffic congestion information.

When a destination of route guidance is set, a predicted arrival time to the destination when using the autonomous driving as the switching target may be presented together with the shift necessity presentation. The predicted arrival time may be estimated using the predicted duration described above. A travel time in sections other than the section in which the autonomous driving is to be performed may be estimated based on a link distance and the average vehicle speed of the subject vehicle. When the predicted duration, the predicted continuous distance, and the predicted arrival time are presented, it is preferable to present values, in a comparable manner, in a case of using and a case of not using the autonomous driving as the switching target. Accordingly, the driver can determine whether to use the autonomous driving by comparing the presented values.

FIFTH EMBODIMENT

When both the area-limited autonomous driving and the traffic congestion-limited autonomous driving are available as the autonomous driving at LV3, it is preferable that the presentation control units 100, 100a distinguish whether the autonomous driving at LV3 is the area-limited autonomous driving or the traffic congestion-limited autonomous driving and control the area-limited autonomous driving or the traffic congestion-limited autonomous driving to be presented. Accordingly, the driver can know in what state the autonomous driving at LV3 becomes possible. For example, when the possibility presentation is taken as an example, the following deviation may be performed. In a case of the area-limited autonomous driving, the possibility presentation such as "the autonomous driving is possible from XX to XX" that indicates a section in which the autonomous driving is possible may be performed. In a case of the traffic congestion-limited autonomous driving, the possibility presentation such as "the autonomous driving at the traffic congested time is possible" may be performed.

SIXTH EMBODIMENT

The embodiments described above show a configuration in which the autonomous driving ECU 80 includes the requirement determination unit, but the disclosure is not limited thereto. For example, a configuration may be formed in which the requirement specifying unit 103 also functions as the requirement determination unit.

Note that the present disclosure is not limited to the embodiments described above and can variously be modified within the scope of the present disclosure. An embodiment obtained by appropriately combining the technical features disclosed in different embodiments may also be included in the technical scope of the present disclosure. The control device, control units and the control method described in the present disclosure may be implemented by a special purpose computer which includes a processor programmed to perform one or more functions executed by computer programs. Alternatively, control device, control units and the control method described in the present disclosure may be implemented by a dedicated hardware logic circuit. The technique for implementing the functions of each functional unit included in the control device or the method thereof does not necessarily need to include software, and all the functions may be implemented using one or more hardware circuits. The computer programs may be stored, as instructions to be executed by a computer, in a tangible non-transitory computer-readable storage medium.

What is claimed is:

1. A vehicle presentation control device usable in a vehicle capable of performing autonomous driving, the vehicle presentation control device comprising:
a requirement specifying unit distinguishably specifying, as an autonomous driving start requirement to be satisfied for a start of autonomous driving without monitoring obligation, at least a driver requirement or an environmental requirement, the autonomous driving without monitoring obligation referring to an autonomous driving in which a driver is not obligated to monitor a periphery of the vehicle, the driver requirement being a requirement highly likely to be solved by the driver of the vehicle and the environmental requirement being a requirement less likely to be solved by the driver of the vehicle; and
a presentation control unit starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified by the requirement specifying unit being the driver requirement.

2. The vehicle presentation control device according to claim 1, further comprising:
a prediction unit predicting a satisfaction of predetermined requirement, the predetermined requirement being at least a part of the environmental requirement,
wherein, when the prediction unit predicts the satisfaction of predetermined requirement, the presentation control unit performs the driver requirement presentation before the satisfaction of predetermined requirement, in response to the autonomous driving start requirement specified by the requirement specifying unit is the driver requirement.

3. The vehicle presentation control device according to claim 2, wherein,
when the prediction unit predicts the satisfaction of predetermined requirement, the presentation control unit further performs reservation necessity presentation, which presents information for inquiring the driver about necessity of reservation for a shift to the autonomous driving,
the vehicle presentation control device further comprises a reservation necessity confirmation unit confirming the necessity of reservation based on a response from the driver to the reservation necessity presentation, and
the presentation control unit performs the driver requirement presentation in response to the reservation necessity confirmation unit confirming that the reservation for the shift to the autonomous driving being necessary and the autonomous driving start requirement specified by the requirement specifying unit being the driver requirement.

4. The vehicle presentation control device according to claim 3, wherein
the vehicle presentation control device is usable in the vehicle capable of performing, as the autonomous driving without monitoring obligation in which the driver is not obligated to monitor the periphery of the vehicle, area-limited autonomous driving in which the driver is not obligated to monitor the periphery of the vehicle within a limited area where the autonomous driving is permitted and traffic congestion-limited autonomous driving in which the driver is not obligated to monitor the periphery of the vehicle during a traffic congestion while the autonomous driving is permitted, and the presentation control unit changes a presentation timing of the reservation necessity presentation according to whether the autonomous driving in which the prediction unit predicts the satisfaction of predetermined requirement is the area-limited autonomous driving or the traffic congestion-limited autonomous driving.

5. The vehicle presentation control device according to claim 2, wherein the presentation control unit changes, corresponding to the driver requirement specified by the requirement specifying unit, at least one of a presentation timing of the driver requirement presentation or an order of the driver requirement presentation, and the order of the driver requirement presentation is a presentation order of multiple types of driver requirements when the requirement specifying unit specifies multiple types of driver requirements.

6. The vehicle presentation control device according to claim 1, wherein the presentation control unit performs the driver requirement presentation when the autonomous driving start requirement specified by the requirement specifying unit includes the driver requirement but not includes the environmental requirement, and the presentation control unit does not perform the driver requirement presentation when the autonomous driving start requirement specified by the requirement specifying unit includes the environmental requirement.

7. The vehicle presentation control device according to claim 6, wherein the presentation control unit further performs shift necessity presentation, which presents information for inquiring the driver about necessity of a shift to the autonomous driving, the vehicle presentation control device further comprises a shift necessity confirmation unit confirming the necessity of the shift based on a response from the driver to the shift necessity presentation, and when the autonomous driving start requirement specified by the requirement specifying unit includes the driver requirement but not include the environmental requirement, the presentation control unit performs the shift necessity presentation together with the driver requirement presentation.

8. The vehicle presentation control device according to claim 6, wherein the presentation control unit further performs shift necessity presentation, which presents information for inquiring the driver about necessity of a shift to the autonomous driving, the vehicle presentation control device further comprises a shift necessity confirmation unit confirming the necessity of the shift based on a response from the driver to the shift necessity presentation, and when the autonomous driving start requirement specified by the requirement specifying unit includes the driver requirement but not include the environmental requirement and the shift necessity confirmation unit confirms that the shift to the autonomous driving is necessary, the presentation control unit performs the driver requirement presentation.

9. The vehicle presentation control device according to claim 1, further comprising:

a prediction unit predicting a satisfaction of predetermined requirement, the predetermined requirement being at least a part of the environmental requirement, wherein, when the prediction unit predicts the satisfaction of predetermined requirement, the presentation control unit further performs reservation necessity presentation, which presents information for inquiring the driver about necessity of reservation for a shift to the autonomous driving, when the prediction unit predicts the satisfaction of predetermined requirement, the presentation control unit is able to perform shift necessity presentation, which presents information for inquiring the driver about necessity of the shift to the autonomous driving, the vehicle presentation control device further comprises:
a reservation necessity confirmation unit confirming the necessity of reservation based on a response from the driver to the reservation necessity presentation; and a shift necessity confirmation unit confirming the necessity of the shift based on a response from the driver to the shift necessity presentation, when the reservation necessity confirmation unit confirms that the reservation for the shift to the autonomous driving is necessary, the presentation control unit does not perform the shift necessity presentation even though entire elements of the autonomous driving start requirement are satisfied and shift to the autonomous driving is performed, and when the reservation necessity confirmation unit confirms that the reservation for the shift to the autonomous driving is not necessary, the presentation control unit performs the shift necessity presentation in response to the entire elements of the autonomous driving start requirement being satisfied.

10. The vehicle presentation control device according to claim 1, further comprising:

a prediction unit predicting a satisfaction of predetermined requirement, the predetermined requirement being at least a part of the environmental requirement, wherein the presentation control unit further performs reservation necessity presentation, which presents information for inquiring the driver about necessity of reservation for a shift to the autonomous driving in response to the prediction unit predicting the satisfaction of predetermined requirement; and a reservation necessity confirmation unit confirming the necessity of reservation based on a response from the driver to the reservation necessity presentation, wherein the presentation control unit changes a presentation timing of the driver requirement presentation according to whether the reservation necessity confirmation unit confirms that the reservation for the shift to the autonomous driving is necessary or that the reservation for the shift to the autonomous driving is not necessary.

11. The vehicle presentation control device according to claim 1, wherein, when the requirement specifying unit fails to specify the driver requirement as the autonomous driving start requirement, the presentation control unit changes an information presentation mode according to whether the environmental requirement is specified.

12. The vehicle presentation control device according to claim 1, wherein the presentation control unit further performs information presentation indicating a current state, which is in a stage before the autonomous driving becomes possible.

13. The vehicle presentation control device according to claim 1, wherein
the vehicle presentation control device is usable in a vehicle capable of performing the autonomous driving without monitoring obligation in which the driver is not obligated to monitor a periphery of the vehicle.

14. A vehicle presentation control system usable in a vehicle capable of performing autonomous driving, the vehicle presentation control system comprising:
a presentation device presenting information to the driver of the vehicle; and
the vehicle presentation control device according to claim 1.

15. A vehicle presentation control device usable in a vehicle capable of performing autonomous driving, the vehicle presentation control device comprising:
a requirement specifying unit distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle;
a presentation control unit starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified by the requirement specifying unit being the driver requirement; and
a prediction unit predicting a satisfaction of predetermined requirement, the predetermined requirement being at least a part of the environmental requirement,
wherein, when the prediction unit predicts the satisfaction of predetermined requirement, the presentation control unit performs the driver requirement presentation before the satisfaction of predetermined requirement, in response to the autonomous driving start requirement specified by the requirement specifying unit is the driver requirement.

16. A vehicle presentation control device usable in a vehicle capable of performing autonomous driving, the vehicle presentation control device comprising:
a requirement specifying unit distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle; and
a presentation control unit starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified by the requirement specifying unit being the driver requirement,
wherein
the presentation control unit performs the driver requirement presentation when the autonomous driving start requirement specified by the requirement specifying unit includes the driver requirement but not includes the environmental requirement, and
the presentation control unit does not perform the driver requirement presentation when the autonomous driving start requirement specified by the requirement specifying unit includes the environmental requirement.

17. A vehicle presentation control device usable in a vehicle capable of performing autonomous driving, the vehicle presentation control device comprising:
a requirement specifying unit distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle;
a presentation control unit starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified by the requirement specifying unit being the driver requirement; and
a prediction unit predicting a satisfaction of predetermined requirement, the predetermined requirement being at least a part of the environmental requirement,
wherein,
when the prediction unit predicts the satisfaction of predetermined requirement, the presentation control unit further performs reservation necessity presentation, which presents information for inquiring the driver about necessity of reservation for a shift to the autonomous driving,
when the prediction unit predicts the satisfaction of predetermined requirement, the presentation control unit is able to perform shift necessity presentation, which presents information for inquiring the driver about necessity of the shift to the autonomous driving,
the vehicle presentation control device further comprises:
a reservation necessity confirmation unit confirming the necessity of reservation based on a response from the driver to the reservation necessity presentation; and
a shift necessity confirmation unit confirming the necessity of the shift based on a response from the driver to the shift necessity presentation,
when the reservation necessity confirmation unit confirms that the reservation for the shift to the autonomous driving is necessary, the presentation control unit does not perform the shift necessity presentation even though entire elements of the autonomous driving start requirement are satisfied and shift to the autonomous driving is performed, and
when the reservation necessity confirmation unit confirms that the reservation for the shift to the autonomous driving is not necessary, the presentation control unit performs the shift necessity presentation in response to the entire elements of the autonomous driving start requirement being satisfied.

18. A vehicle presentation control device usable in a vehicle capable of performing autonomous driving, the vehicle presentation control device comprising:
- a requirement specifying unit distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle;
- a presentation control unit starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified by the requirement specifying unit being the driver requirement;
- a prediction unit predicting a satisfaction of predetermined requirement, the predetermined requirement being at least a part of the environmental requirement, wherein the presentation control unit further performs reservation necessity presentation, which presents information for inquiring the driver about necessity of reservation for a shift to the autonomous driving in response to the prediction unit predicting the satisfaction of predetermined requirement; and
- a reservation necessity confirmation unit confirming the necessity of reservation based on a response from the driver to the reservation necessity presentation,
- wherein the presentation control unit changes a presentation timing of the driver requirement presentation according to whether the reservation necessity confirmation unit confirms that the reservation for the shift to the autonomous driving is necessary or that the reservation for the shift to the autonomous driving is not necessary.

19. A vehicle presentation control device usable in a vehicle capable of performing autonomous driving, the vehicle presentation control device comprising:
- a requirement specifying unit distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle; and
- a presentation control unit starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified by the requirement specifying unit being the driver requirement,
- wherein, when the requirement specifying unit fails to specify the driver requirement as the autonomous driving start requirement, the presentation control unit changes an information presentation mode according to whether the environmental requirement is specified.

20. A vehicle presentation control method usable in a vehicle capable of performing autonomous driving, the vehicle presentation control method comprising instructions to be executed by at least one processor to perform:
- a requirement specifying step distinguishably specifying, as an autonomous driving start requirement to be satisfied for a start of autonomous driving without monitoring obligation, at least a driver requirement or an environmental requirement, the autonomous driving without monitoring obligation referring to an autonomous driving in which a driver is not obligated to monitor a periphery of the vehicle, the driver requirement being a requirement highly likely to be solved by the driver of the vehicle and the environmental requirement being a requirement less likely to be solved by the driver of the vehicle; and
- a presentation control step starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified in the requirement specifying step being the driver requirement.

21. A vehicle presentation control method usable in a vehicle capable of performing autonomous driving, the vehicle presentation control method comprising instructions to be executed by at least one processor to perform:
- a requirement specifying step distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle;
- a presentation control step starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified in the requirement specifying step being the driver requirement; and
- a prediction step predicting a satisfaction of predetermined requirement, the predetermined requirement being at least a part of the environmental requirement.

22. A vehicle presentation control method usable in a vehicle capable of performing autonomous driving, the vehicle presentation control method comprising instructions to be executed by at least one processor to perform:
- a requirement specifying step distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle; and
- a presentation control step starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified in the requirement specifying step being the driver requirement;

wherein the presentation control step performs the driver requirement presentation when the autonomous driving start requirement specified in the requirement specifying step includes the driver requirement but not includes the environmental requirement, and the presentation control step does not perform the driver requirement presentation when the autonomous driving start requirement specified in the requirement specifying step includes the environmental requirement.

23. A vehicle presentation control method usable in a vehicle capable of performing autonomous driving, the vehicle presentation control method comprising instructions to be executed by at least one processor to perform:

a requirement specifying step distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle;

a presentation control step starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified in the requirement specifying step being the driver requirement; and a prediction step predicting a satisfaction of predetermined requirement, the predetermined requirement being at least a part of the environmental requirement, wherein, when the prediction step predicts the satisfaction of predetermined requirement, the presentation control step further performs reservation necessity presentation, which presents information for inquiring the driver about necessity of reservation for a shift to the autonomous driving, when the prediction step predicts the satisfaction of predetermined requirement, the presentation control step is able to perform shift necessity presentation, which presents information for inquiring the driver about necessity of the shift to the autonomous driving, the instructions to be executed by the at least one processor further perform:

a reservation necessity confirmation step confirming the necessity of reservation based on a response from the driver to the reservation necessity presentation; and a shift necessity confirmation step confirming the necessity of the shift based on a response from the driver to the shift necessity presentation, when the reservation necessity confirmation step confirms that the reservation for the shift to the autonomous driving is necessary, the presentation control step does not perform the shift necessity presentation even though entire elements of the autonomous driving start requirement are satisfied and shift to the autonomous driving is performed, and when the reservation necessity confirmation step confirms that the reservation for the shift to the autonomous driving is not necessary, the presentation control step performs the shift necessity presentation in response to the entire elements of the autonomous driving start requirement being satisfied.

24. A vehicle presentation control method usable in a vehicle capable of performing autonomous driving, the vehicle presentation control method comprising instructions to be executed by at least one processor to perform:

a requirement specifying step distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle;

a presentation control step starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified in the requirement specifying step being the driver requirement;

a prediction step predicting a satisfaction of predetermined requirement, the predetermined requirement being at least a part of the environmental requirement, wherein the presentation control step further performs reservation necessity presentation, which presents information for inquiring the driver about necessity of reservation for a shift to the autonomous driving in response to the prediction step predicting the satisfaction of predetermined requirement; and a reservation necessity confirmation step confirming the necessity of reservation based on a response from the driver to the reservation necessity presentation, wherein the presentation control step changes a presentation timing of the driver requirement presentation according to whether the reservation necessity confirmation step confirms that the reservation for the shift to the autonomous driving is necessary or that the reservation for the shift to the autonomous driving is not necessary.

25. A vehicle presentation control method usable in a vehicle capable of performing autonomous driving, the vehicle presentation control method comprising instructions to be executed by at least one processor to perform:

a requirement specifying step distinguishably specifying, as an autonomous driving start requirement to be satisfied for a start of autonomous driving, at least a driver requirement or an environmental requirement, the driver requirement being a requirement highly likely to be solved by a driver of the vehicle and the environmental requirement being a requirement less likely to be solved by the driver of the vehicle; and a presentation control step starting, as requirement presentation that presents information about requirement necessary for the start of autonomous driving, driver requirement presentation, which indicates that the driver requirement is necessary for the start of autonomous driving, before the start of autonomous driving, in response to the autonomous driving start requirement specified in the requirement specifying step being the driver requirement, wherein, when the requirement specifying step fails to specify the driver requirement as the autonomous driving start requirement, the presentation control step changes an information presentation mode according to whether the environmental requirement is specified.

* * * * *